United States Patent
Berlowitz et al.

(10) Patent No.: US 9,774,053 B2
(45) Date of Patent: *Sep. 26, 2017

(54) INTEGRATED POWER GENERATION AND CARBON CAPTURE USING FUEL CELLS

(71) Applicant: ExxonMobil Research and Engineering Company, Annandale, NJ (US)

(72) Inventors: Paul J. Berlowitz, Glen Gardner, NJ (US); Timothy Andrew Barckholtz, Whitehouse Station, NJ (US); Frank Hershkowitz, Basking Ridge, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 463 days.

This patent is subject to a terminal disclaimer.

(21) Appl. No.: 14/197,613

(22) Filed: Mar. 5, 2014

(65) Prior Publication Data

US 2014/0272616 A1   Sep. 18, 2014

Related U.S. Application Data

(60) Provisional application No. 61/787,879, filed on Mar. 15, 2013, provisional application No. 61/788,628, (Continued)

(51) Int. Cl.
  *H01M 8/06*     (2016.01)
  *H01M 8/0668*   (2016.01)
  (Continued)

(52) U.S. Cl.
  CPC ..... *H01M 8/0668* (2013.01); *H01M 8/04097* (2013.01); *H01M 8/0662* (2013.01);
  (Continued)

(58) Field of Classification Search
  CPC ............ H01M 8/0618; H01M 8/0637; H01M 8/0668; H01M 4/8647; H01M 2008/147;
  (Continued)

(56) References Cited

U.S. PATENT DOCUMENTS 4,160,663 A   7/1979  Hsieh
4,772,634 A   9/1988  Farooque
(Continued)

FOREIGN PATENT DOCUMENTS

CA   2120858 A1   10/1994
CA   23250702 A1   4/2002
(Continued)

OTHER PUBLICATIONS

Cavallaro et al., "Syngas and electricity production by an integrated autothermal reforming/molten carbonate fuel cell system", Journal of Power Sources, Dec. 1, 1988 pp. 190-196, vol. 76, No. 2, Elsevier.

(Continued)

*Primary Examiner* — Stephen Yanchuk
(74) *Attorney, Agent, or Firm* — David M. Weisberg; Chad A. Guice; Liza Negron

(57) ABSTRACT

Systems and methods are provided for capturing $CO_2$ from a combustion source using molten carbonate fuel cells (MCFCs). At least a portion of the anode exhaust can be recycled for use as part of anode input stream. This can allow for a reduction in the amount of fuel cell area required for separating $CO_2$ from the combustion source exhaust and/or modifications in how the fuel cells can be operated.

30 Claims, 6 Drawing Sheets

US 9,774,053 B2

Page 2

Related U.S. Application Data filed on Mar. 15, 2013, provisional application No. 61/787,587, filed on Mar. 15, 2013, provisional application No. 61/787,697, filed on Mar. 15, 2013.

(51) Int. Cl.
- H01M 8/0662 (2016.01)
- H01M 8/04089 (2016.01)
- H01M 8/14 (2006.01)

(52) U.S. Cl.
CPC ........ H01M 2008/147 (2013.01); Y02E 20/16 (2013.01); Y02E 60/526 (2013.01)

(58) Field of Classification Search
CPC ... C01B 3/38; C01B 2203/0233; F01D 13/00; F02C 3/22; F02C 6/18; Y01E 60/526; Y02E 20/16; Y02E 60/50; Y02P 70/56; Y02P 10/132
See application file for complete search history.

(56) References Cited

U.S. PATENT DOCUMENTS

| | | | |
|---|---|---|---|
| 4,917,971 A | 4/1990 | Farooque | |
| 4,995,807 A | 2/1991 | Rampley et al. | |
| 5,071,719 A | 12/1991 | Rostrup-Nielsen et al. | |
| 5,417,051 A | 5/1995 | Ankersmit et al. | |
| 5,541,014 A | 7/1996 | Micheli et al. | |
| 5,833,734 A | 11/1998 | Cip et al. | |
| 6,162,556 A | 12/2000 | Vollmar et al. | |
| 6,365,290 B1 | 4/2002 | Ghezel-Ayagh et al. | |
| 6,896,988 B2 | 5/2005 | Wang et al. | |
| 7,396,603 B2 | 7/2008 | Farooque et al. | |
| 7,563,527 B2 | 7/2009 | Tanaka et al. | |
| 7,862,938 B2 | 1/2011 | Ghezel-Ayagh | |
| 8,047,007 B2 | 11/2011 | Zubrin et al. | |
| 8,080,344 B2 | 12/2011 | Skok et al. | |
| 8,142,943 B2 | 3/2012 | McElroy et al. | |
| 9,553,321 B2* | 1/2017 | Berlowitz | C01B 3/34 |
| 9,556,753 B2* | 1/2017 | Barckholtz | F01K 23/10 |
| 2003/0143448 A1 | 7/2003 | Keefer | |
| 2004/0202914 A1 | 10/2004 | Sridhar et al. | |
| 2005/0106429 A1 | 5/2005 | Keefer | |
| 2005/0164051 A1 | 7/2005 | Venkataraman et al. | |
| 2006/0251940 A1 | 11/2006 | Bandhauer et al. | |
| 2007/0017367 A1 | 1/2007 | McElroy et al. | |
| 2007/0072027 A1 | 3/2007 | Sridhar et al. | |
| 2007/0099038 A1 | 5/2007 | Galloway | |
| 2007/0184310 A1 | 8/2007 | Kim et al. | |
| 2007/0287046 A1 | 12/2007 | Koda et al. | |
| 2008/0160358 A1 | 7/2008 | Parodi et al. | |
| 2009/0169452 A1 | 7/2009 | Constantz et al. | |
| 2009/0208784 A1 | 8/2009 | Perry et al. | |
| 2009/0317667 A2 | 12/2009 | Nervi et al. | |
| 2010/0239924 A1 | 9/2010 | McElroy et al. | |
| 2011/0111314 A1* | 5/2011 | Cui | C01B 3/38 |
| | | | 429/417 |
| 2011/0167821 A1 | 7/2011 | Baker et al. | |
| 2013/0014484 A1 | 1/2013 | Caprile et al. | |

FOREIGN PATENT DOCUMENTS

| | | |
|---|---|---|
| DE | 4005468 A1 | 8/1991 |
| DE | 19515669 A1 | 10/1996 |
| DE | 19545186 A1 | 6/1997 |
| DE | 19941724 A1 | 8/2000 |
| DE | 10016847 A1 | 10/2001 |
| EP | 0170277 A2 | 5/1986 |
| EP | 0473153 A2 | 4/1992 |
| JP | H05163180 A | 6/1993 |
| KR | 20110029963 A | 3/2011 |
| KR | 20120050319 A | 5/2012 |
| NL | 1008883 C2 | 10/1999 |
| WO | 9733828 A1 | 9/1997 |
| WO | 02069430 A2 | 9/2002 |
| WO | 02070402 A2 | 9/2002 |
| WO | 2005001977 A1 | 1/2005 |
| WO | 2008036169 A2 | 3/2008 |
| WO | 2010044113 A1 | 4/2010 |
| WO | 2010067223 A1 | 6/2010 |
| WO | 2010125443 A1 | 11/2010 |
| WO | 2010147885 A1 | 12/2010 |
| WO | 2011077224 A1 | 6/2011 |

OTHER PUBLICATIONS

Appleby et al., "Current Technology of PAFC, MCFC and SOFC Systems: Status of Present Fuel Cell Power Plants", Electrochemical Hydrogen Technologies, Electrochemical Production and Combustion of Hydrogen, Jan. 1, 1990, pp. 425-495, Elsevier.

Appleby, "Fuel Cells and Hydrogen Fuel", International Journal of Hydrogen Energy, Feb. 1, 1994, pp. 175-180 vol. 19, No. 2, International Association for Hydrogen Energy, Pergamon Press Ltd., Great Britain.

Chiesa et al., "A Comparative Analysis of IGCCs with CO2 Sequestration", In: Proceedings of 4th International Conference on Greenhouse Gas Control Technologies, Interlaken, Switzerland Aug. 30, 1998-Sep. 2, 1998, pp. 107-112.

Amorelli et al., "An experimental investigation into the use of molten carbonate fuel cells to capture CO2 from gas turbine exhaust gases", 2nd annual conference on Carbon Seqquestration, May 5, 2003 to May 8, 2003, Hilton Alexandria Mark Center, Alexandria, VA.

Sugiura et al., "The carbon dioxide concentrator by using MCFC", Journal of Power Sources, May 25, 2003, pp. 218-227, vol. 118, No. 1-2, ScienceDirect, Elsevier.

Steynberg et al., eds., "Gas loop for POX reformers", Studies in Surface Science and Catalysis: Fischer Tropsch Technology, Jul. 28, 2004, vol. 152, p. 432, fig. 8, Elsevier B.V.

Verda et al., "Thermodynamic and economic optimization of a MCFC-based hybrid system for the combined production of electricity and hydrogen". International Journal of Hydrogen Energy, Jan. 1, 2010, vol. 35, No. 2, pp. 794-806, ScienceDirect, Elsevier.

Campanari et al., "CO2 capture from combined cycles integrated with Molten Carbonate Fuel Cells", International Journal of Greenhouse Gas Control, May 1, 2010, pp. 441-451, vol. 4, No. 3, Greenhouse Gas Control, ScienceDirect, Elsevier.

Kim et al., "Numerical studies of a separator for stack temperature control in a molten carbonate fuel cell", International Journal of Hydrogen Energy, Apr. 7, 2011, vol. 36, No. 14, pp. 8499-8507, ScienceDirect, Elsevier.

Pilatowski et al., "Thermodynamics of Fuel Cells", Cogeneration Fuel Cell-Sorption Air Conditioning Systems, Jun. 2, 2011, pp. 25-36, Springer.

Lowe et al., "Technology Assessment of Hydrogen Firing of Process Heaters", Energy Procedia, Jul. 1, 2011, pp. 1058-1065, vol. 4, ScienceDirect, Elsevier.

Appl, "Ammonia, 3. Production Plants", Ullmann's Encyclopedia of Industrial Chemistry, Oct. 15, 2011, vol. 3, Wiley-Verlag GmbH & Co., Weinheim.

Anonymous, "Lower and Higher Heating Values of Fuels", Hydrogen Data Resource Center: Hydrogen Calculator, Jan. 1, 2012, U.S. Dept. of Energy.

Giddey et al., "A comprehensive review of direct carbon fuel cell technology", Progress in Energy Combustion Science, Jan. 28, 2012, pp. 360-399, vol. 38, No. 3, Science Direct, Elsevier.

Anonymous, "Heat of Combustion", Wikipedia, the free Encyclopedia, Jun. 6, 2014.

International Search Report with Written Opinion from PCT/US2014/025173 dated Jun. 13, 2014.

International Search Report with Written Opinion from PCT/US2014/025214 dated Jul. 4, 2014.

International Search Report with Written Opinion from PCT/US2014/025228 dated Jul. 4, 2014.

International Search Report with Written Opinion from PCT/US2014/025237 dated Jul. 4, 2014.

(56) References Cited

OTHER PUBLICATIONS

International Search Report with Written Opinion from PCT/US2014/025181 dated Jul. 7, 2014.
International Search Report with Written Opinion from PCT/US2014/025186 dated Jul. 7, 2014.
International Search Report with Written Opinion from PCT/US2014/025189 dated Jul. 7, 2014.
International Search Report with Written Opinion from PCT/US2014/025240 dated Jul. 8, 2014.
International Search Report with Written Opinion from PCT/US2014/025216 dated Jul. 15, 2014.
International Search Report with Written Opinion from PCT/US2014/025223 dated Jul. 15, 2014.
International Search Report with Written Opinion from PCT/US2014/025192 dated Jul. 22, 2014.
International Search Report with Written Opinion from PCT/US2014/025208 dated Jul. 22, 2014.
International Search Report with Written Opinion from PCT/US2014/025195 dated Jul. 24, 2014.
International Search Report with Written Opinion from PCT/US2014/025180 dated Jul. 28, 2014.
International Search Report with Written Opinion from PCT/US2014/025175 dated Jul. 28, 2014.
International Search Report with Written Opinion from PCT/US2014/025185 dated Jul. 28, 2014.
International Search Report with Written Opinion from PCT/US2014/025212 dated Jul. 28, 2014.
International Search Report with Written Opinion from PCT/US2014/025179 dated Aug. 5, 2014.
International Search Report with Written Opinion from PCT/US2014/025229 dated Aug. 5, 2014.
Partial International Search Report from PCT/US2014/025188 dated Aug. 29, 2014.
Partial International Search Report from PCT/US2014/025219 dated Aug. 29, 2014.
International Search Report with Written Opinion from PCT/US2014/025203 dated Sep. 1, 2014.
Campanari, "Carbon Dioxide separation from high temperature fuel cell power plants", Journal of Power Sources, 2002, vol. 112, pp. 273-289, Science Direct, Elsevier.
Amorelli et al., "An experimental investigation into the use of molten carbonate fuel cells to capture CO2 from gas turbine exhaust gases", Energy, 2004, vol. 29, pp. 1279-1284, Science Direct, Elsevier.
Greenhouse Gas Technology Center, "Test and Quality Assurance Plan: FuelCell Energy, Inc.—DFC 300A Molten Carbonate Fuel Cell Combined Heat and Power System" SRI/USEPA, Mar. 2007, p. 1-42, Southern Research Institute, Morrisville, NC.
"Molten Carbonate Fuel Cell Technology", Fossil Energy Office of Communications, Jan. 31, 2011, U.S. Department of Energy.
Campanari et al., "Application of MCFCs for active CO2 capture within natural gas combine cycles" Energy Procedia, 2011, vol. 4, pp. 1235-1242, Science Direct, Elsevier.
Caprile, "Carbon capture: Energy wasting technologies or the MCFCs challenge?", International Journal of Hydrogen Energy, 2011, vol. 36, pp. 10269-10277, Science Direct, Elsevier.
Chiesa et al., "CO2 cryagenic separation from combined cycles integrated with molten carbonate fuel cells", International Journal of Hydrogen Energy, 2011, vol. 36, pp. 10355-10365, Science Direct, Elsevier.
Wesoff, "Will FuelCell Energy Be the First Profitable Company in the Industry?", Greentech Media, Dec. 15, 2011.
Manzolini, G., et al., "CO2 Separation from Combined Cycles Using Molten Carbonate Fuel Cells," Journal of Fuel Cell Science and Technology, Feb. 2012, pp. 011018-1 to 011018-8, vol. 9, issue 1, American Society of Mechanical Engineers.
Ghezel-Ayagh, "Electrochemical Membrane for CO2 Capture and Power Generation (No. DE-FE0007634)", presentation given at the 2012 NETL CO2 Capture Technology Meeting, Jul. 9, 2012, Pittsburgh, PA.
Desideri, et al., "MCFC-based CO2 capture system for small scale CHP plants," International Journal of Hydrogen Energy, Dec. 2012, pp. 19295-19303, vol. 37, issue 24, SciVerse Science Direct, Elsevier.
Ghezel-Ayagh, "High Efficiency Direct FuelCell/Turbine® Power Plant", Project Fact Sheet for unit installed at the Billings Clinic in Billings, Montana, U.S. Department of Energy.
Office Action from related U.S. Appl. No. 14/315,419 dated Aug. 1, 2014.
Office Action from related U.S. Appl. No. 14/315,419 dated Jan. 27, 2015.
Office Action from related U.S. Appl. No. 14/315,439 dated Dec. 29, 2014.
Office Action from related U.S. Appl. No. 14/315,527 dated Jan. 9, 2015.
Office Action from related U.S. Appl. No. 14/315,479 dated Nov. 7, 2014.
International Search Report with Written Opinion from PCT/US2014/025188 dated Jan. 21, 2015.
International Search Report with Written Opinion from PCT/US2014/025219 dated Jan. 21, 2015.

* cited by examiner

| | 1a (comparative) | 2a | 2b | 2c | 2d | 2e |
|---|---|---|---|---|---|---|
| MCFC CO2 Exhaust Conc. (%) | 1.45 | 1.45 | 1.45 | 1.45 | 1.45 | 1.45 |
| MCFC O2 Exhaust Conc. (%) | 3.0 | 4.7 | 4.7 | 4.7 | 4.7 | 4.7 |
| MCFC voltage (V) | 0.7 | 0.7 | 0.7 | 0.7 | 0.7 | 0.7 |
| MCFC Current Density (A/m$^2$) | 1075 | 1160 | 1230 | 1255 | 1650 | 1550 |
| MCFC Area (k-m$^2$) | 208 | 161 | 152 | 149 | 113 | 120 |
| CO$_2$ Capture (%) | 85.2 | 83.7 | 83.8 | 83.8 | 83.9 | 83.9 |
| CO$_2$ Capture (Mtons / year) | 2.05 | 1.84 | 1.84 | 1.84 | 1.84 | 1.85 |
| Area / Tons captured (k-m$^2$*year / Mtons) | 101.4 | 87.5 | 82.4 | 80.8 | 61.3 | 65 |
| CO$_2$ emissions (from cathode exhaust, lbs CO$_2$ / MWhr) | 111 | 123 | 123 | 122 | 123 | 124 |
| Ratio H$_2$:C (molar) in anode feed | 0 | 0.55 | 1.22 | 1.22 | 3.85 | 3.85 |
| N$_2$ in anode feed % | 1 | 9 | 8.9 | 14.8 | 14.5 | 18.9 |
| Anode steam penalty (MW) | -10.9 | -7 | -7 | -0.4 | -7 | -0.4 |
| Cryogenic separation penalty (MW) | -18.9 | -16.6 | -13.5 | -8 | -17.7 | -12.2 |
| % turbine fuel that is H$_2$ or CO | 0 | 0 | 0 | 0 | 0 | 0 |
| Total net power (MW) | 724 | 661 | 664 | 676 | 660 | 672 |
| Electrical efficiency (%) | 58.9 | 58.9 | 59.1 | 60.2 | 58.9 | 59.8 |

FIG. 6

INTEGRATED POWER GENERATION AND CARBON CAPTURE USING FUEL CELLS

CROSS-REFERENCE TO RELATED APPLICATIONS

This application claims the benefit of U.S. Application Ser. Nos. 61/788,628, 61/787,587, 61/787,697, and 61/787,879, each filed on Mar. 15, 2013; which are each incorporated by reference herein in their entirety, as well as the three U.S. non-provisional applications filed on even date herewith and also claiming priority to the four provisional applications enumerated above, each of which non-provisional applications also being incorporated by reference herein in their entirety.

FIELD OF THE INVENTION

In various aspects, the invention is related to low emission power production with separation and/or capture of resulting emissions via integration of molten carbonate fuel cells with a combustion power source.

BACKGROUND OF THE INVENTION

Capture of gases emitted from power plants is an area of increasing interest. Power plants based on the combustion of fossil fuels (such as petroleum, natural gas, or coal) generate carbon dioxide as a by-product of the reaction. Historically this carbon dioxide has been released into the atmosphere after combustion. However, it is becoming increasingly desirable to identify ways to find alternative uses for the carbon dioxide generated during combustion.

One option for managing the carbon dioxide generated from a combustion reaction is to use a capture process to separate the $CO_2$ from the other gases in the combustion exhaust. An example of a traditional method for capturing carbon is passing the exhaust stream through an amine scrubber. While an amine scrubber can be effective for separating $CO_2$ from an exhaust stream, there are several disadvantages. In particular, energy is required to operate the amine scrubber and/or modify the temperature and pressure of the exhaust stream to be suitable for passing through an amine scrubber. The energy required for $CO_2$ separation reduces the overall efficiency of the power generation process.

In order to offset the power required for $CO_2$ capture, one option is to use a molten carbonate fuel cell to assist in $CO_2$ separation. The fuel cell reactions that cause transport of $CO_2$ from the cathode portion of the fuel cell to the anode portion of the fuel cell can also result in generation of electricity. However, conventional combinations of a combustion powered turbine generator with fuel cells for carbon separation have resulted in a net reduction in power generation efficiency per unit of fuel consumed.

An article in the Journal of Fuel Cell Science and Technology (G. Manzolini et. al., *J. Fuel Cell Sci. and Tech.*, Vol. 9, February 2012) describes a power generation system that combines a combustion power generator with molten carbonate fuel cells. The combustion output from the combustion generator is used in part as the input for the cathode of the fuel cell. This input is supplemented with a recycled portion of the anode output after passing through the anode output through a cryogenic $CO_2$ separator.

An article by Desideri et al. (*Intl. J. of Hydrogen Energy*, Vol. 37, 2012) describes a method for modeling the performance of a power generation system using a fuel cell for $CO_2$ separation. Recirculation of anode exhaust to the anode inlet and the cathode exhaust to the cathode inlet are used to improve the performance of the fuel cell. Based on the model and configuration shown in the article, increasing the $CO_2$ utilization within the fuel cell is shown as being desirable for improving separation of $CO_2$.

U.S. Pat. No. 7,396,603 describes an integrated fossil fuel power plant and fuel cell system with $CO_2$ emissions abatement. At least a portion of the anode output is recycled to the anode input after removal of a portion of $CO_2$ from the anode output.

SUMMARY OF THE INVENTION

In one aspect, a method is provided for capturing carbon dioxide from a combustion source. The method includes capturing an output stream from a combustion source, said captured output stream comprising oxygen and carbon dioxide; processing the captured output stream with a fuel cell array of one or more molten carbonate fuel cells, the one or more fuel cells each having an anode and a cathode, the molten carbonate fuel cells being operatively connected to the carbon dioxide stream through one or more cathode inlets of molten carbonate fuel cells in the fuel cell array; reacting fuel with carbonate from the one or more fuel cell cathodes within the one or more fuel cell anodes to produce electricity, an anode exhaust stream from at least one anode outlet of the fuel cell array comprising carbon dioxide and hydrogen, at least a portion of the fuel reacted with carbonate comprising hydrogen recycled from the anode exhaust stream; separating carbon dioxide from the anode exhaust stream in one or more separation stages; and recycling at least a portion of the anode exhaust stream to the anode after separation of the carbon dioxide from the anode exhaust stream. Optionally, the fuel utilization of the fuel cell can be about 60% or less and/or the anode exhaust stream can be passed through a water gas shift reaction stage prior to the separating of carbon dioxide from the anode exhaust.

BRIEF DESCRIPTION OF THE DRAWINGS

FIG. 6 shows results from simulations of various configurations of a power generation system including a combustion-powered turbine and a molten carbonate fuel cell for carbon dioxide separation.

DETAILED DESCRIPTION OF THE EMBODIMENTS

Figure 1:
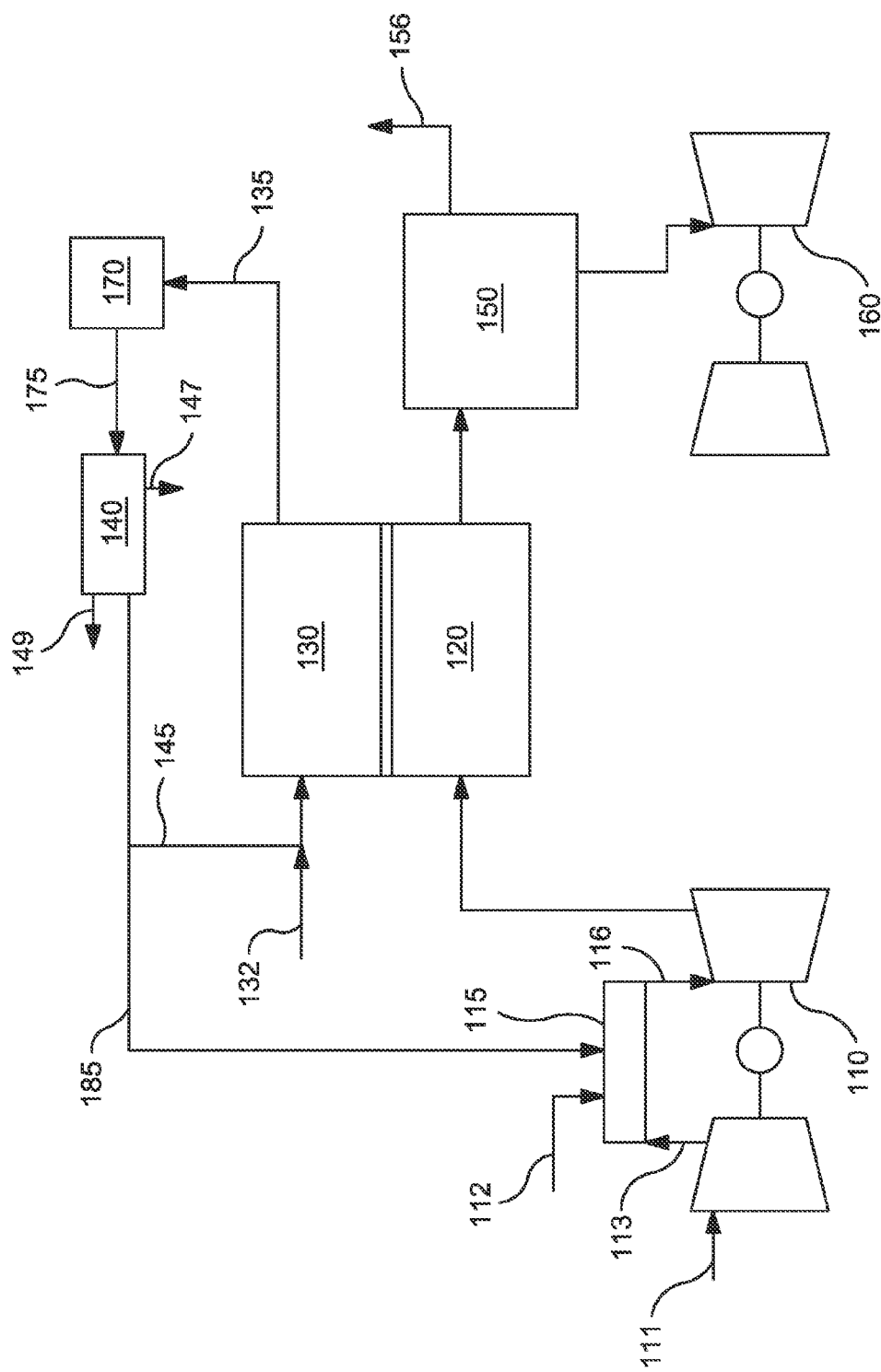
FIG. 1 schematically shows an example of a combined cycle system for generating electricity based on combustion of a carbon-based fuel.

In various aspects, systems and methods are provided for capturing $CO_2$ from a combustion source using molten carbonate fuel cells (MCFCs). The systems and methods can address one or more problems related to carbon capture from combustion exhaust stream and/or performing carbon capture using molten carbonate fuel cells.

One difficulty with using molten carbonate fuel cells for separation of $CO_2$ from an exhaust stream can include the large area of fuel cells typically required for handling the exhaust from a commercial scale turbine or other power/heat generator. Accommodating a commercial scale exhaust flow using molten carbonate fuel cells can typically involve using a plurality of fuel cells, rather than constructing a single fuel cell of sufficient area. In order to deliver the exhaust stream to this plurality of fuel cells, additional connections can be required in order to divide the exhaust between the various fuel cells. Thus, reducing the fuel cell area required to capture a desired amount of carbon dioxide can provide a corresponding decrease in the number and/or complexity of flow connections required.

In some aspects of the invention, the area of fuel cells required for processing a $CO_2$-containing exhaust stream can be reduced or minimized by recycling at least a portion of the anode exhaust stream back to the anode inlet. Additionally or alternately, the fuel cells can be operated at lower fuel utilization. An exhaust stream can be passed into the cathode(s) of molten carbonate fuel cells. During operation of the fuel cell, the anode exhaust can be passed through one or more separation stages. This can include separation stages for removal of $H_2O$ and/or $CO_2$. At least a portion of the remaining anode exhaust can then be recycled to the anode input. In one preferred embodiment, any recycle of the anode exhaust, either direct or indirect, to the cathode can be avoided. By recycling the anode exhaust to the anode inlet, any fuel not used on the first pass through the anode can be utilized in a subsequent pass.

Another feature that can contribute to a reduced fuel cell area can include avoiding to transfer of $CO_2$ from the anode exhaust back to the inlet of the cathode. Avoiding this transfer can include avoiding either a direct transfer or an indirect transfer. During conventional fuel cell operation, at least a portion of the anode exhaust is used as the input for the cathode. This would represent a direct transfer of $CO_2$ from the anode to the cathode. An indirect transfer can correspond to recycling a portion of the anode exhaust to a location upstream from the cathode, such as to a combustion burner located upstream from the cathode inlet. In either situation, providing a pathway for the anode exhaust to return to the cathode inlet means that a pathway is available for $CO_2$ to return to the cathode inlet after being separated out and transferred to the anode side of the fuel cell. Any $CO_2$ recycled to the cathode inlet can advantageously be transferred to the anode again, in order to avoid loss to the environment. These multiple transfers from cathode to anode for a single $CO_2$ molecule could mean that additional fuel cell area may be needed in order to capture the same net amount of $CO_2$.

Another challenge with using molten carbonate fuel cells can be due to the relatively low $CO_2$ content of the exhaust of properly operated gas turbine. For example, a gas turbine powered by a low $CO_2$ content natural gas fuel source can generate an exhaust, for example, with a $CO_2$ of about 4 vol %. If some type of exhaust gas recycle is used, this value can be raised, for example, to about 6 vol %. By contrast, a typical desired $CO_2$ content for the input to the cathode of a molten carbonate fuel cell can be about 10% or more. In some aspects of the invention, systems and methods are provided herein to allow for increased $CO_2$ content in the exhaust gas while still efficiently operating the gas turbine or other combustion powered generator. In some aspects of the invention, systems and methods are provided for improving and/or optimizing the efficiency of carbon capture by the fuel cell when operated with a cathode exhaust having a low $CO_2$ content.

Still another challenge can include reducing or mitigating the loss of efficiency in power generation caused by carbon capture. As noted above, conventional methods of carbon capture can result in a loss of net efficiency in power generation per unit of fuel consumed. In some aspects of the invention, systems and methods are provided for improving the overall power generation efficiency. Additionally or alternately, in some aspects of the invention, methods are provided for separating $CO_2$ in a manner to reduce and/or minimize the energy required for generation of a commercially valuable $CO_2$ stream.

In most aspects of the invention, one or more of the above advantages can be achieved, at least in part, by using molten carbonate fuel cells in combination with a combined cycle power generation system, such as a natural gas fired combined cycle plant, where the flue gas and/or heat from combustion reaction(s) can also be used to power a steam turbine. More generally, the molten carbonate fuel cells can be used in conjunction with various types of power or heat generation systems, such as boilers, combustors, catalytic oxidizers, and/or other types of combustion powered generators. In some aspects of the invention, at least a portion of the anode exhaust from the MCFCs can be (after separation of $CO_2$) recycled to the input flow for the MCFC anode(s). A water-gas shift reaction zone after the anode exhaust can optionally be used to further increase the amount of $H_2$ present in the anode exhaust while also allowing conversion of CO into more easily separable $CO_2$.

In some aspects of the invention, recycling at least a portion of the anode exhaust to the anode inlet can allow for a reduced amount of reforming and/or elimination of the reforming stage prior to the anode inlet. Instead of reforming a fuel stream prior to entering the anode, the recycled anode exhaust can provide sufficient hydrogen for the fuel input to the anode. This can allow the input stream for the anode to be passed into the anode without passing through a separate pre-reforming stage. Operating the anode at a reduced level of hydrogen fuel utilization can further facilitate reducing and/or eliminating the pre-reforming stage by providing an anode exhaust with increased hydrogen content.

In various aspects of the invention, an improved method for capturing $CO_2$ from a combustion source using a molten carbonate fuel cell can be provided. This can include, for example, systems and methods for power generation using turbines (or other power or heat generation methods based on combustion, such as boilers, combustors, and/or catalytic oxidizers) while reducing and/or mitigating emissions during power generation. This can optionally be achieved, at least in part, by using a combined cycle power generation system, where the flue gas and/or heat from combustion reaction(s) can also be used to power a steam turbine. This can additionally or alternately be achieved, at least in part, by using one or more molten carbonate fuel cells (MCFCs) as both a carbon capture device as well as an additional source of electrical power. In some aspects of the invention, the MCFCs can be operated under low fuel utilization conditions that can allow for improved carbon capture in the fuel cell while also reducing and/or minimizing the amount fuel lost or wasted. Additionally or alternately, the MCFCs can be operated to reduce and/or minimize the total number and/or volume of MCFCs required to reduce the $CO_2$ content of a combustion flue gas stream to a desired level, for example, 1.5 vol % or less or 1.0 vol % or less. Such aspects can be enabled, at least in part, by recycling the exhaust from the anode back to the inlet of the anode, with removal of at least a portion of the $CO_2$ in the anode exhaust prior to returning the anode exhaust to the anode inlet. Such removal of $CO_2$ from the anode exhaust can be achieved, for example, using a cryogenic $CO_2$ separator. In some optional aspects of the invention, the recycle of anode exhaust to the anode inlet can be performed so that no pathway is provided for the anode exhaust to be recycled to the cathode inlet. By avoiding recycle of anode exhaust to the cathode inlet, any $CO_2$ transported to the anode recycle loop via the MCFCs can remain in the anode recycle loop until the $CO_2$ is separated out from the other gases in the loop.

Molten carbonate fuel cells are conventionally used in a standalone mode to generate electricity. In a standalone mode, an input stream of fuel, such as methane, can be passed into the anode side of a molten carbonate fuel cell. The methane can be reformed (either externally or internally) to form $H_2$ and other gases. The $H_2$ can then be reacted with carbonate ions that have crossed the electrolyte from the cathode in the fuel cell to form $CO_2$ and $H_2O$. For the reactions in the anode of the fuel cell, the rate of fuel utilization is typically about 70% or 75%, or even higher. In a conventional configuration, the remaining fuel in the anode exhaust can be oxidized (burned) to generate heat for maintaining the temperature of the fuel cell and/or external reformer, in view of the endothermic nature of the reforming reaction. Air and/or another oxygen source can be added during this oxidation to allow for more complete combustion. The anode exhaust (after oxidation) can then be passed into the cathode. In this manner, a single fuel stream entering the anode can be used to provide all of the energy and nearly all of the reactants for both anode and cathode. This configuration can also allow all of the fuel entering the anode to be consumed while only requiring ~70% or ~75% or slightly more fuel utilization in the anode.

In the above standalone method, typical of conventional systems, the goal of operating a molten carbonate fuel cell is generally to efficiently generate electric power based on an input fuel stream. By contrast, a molten carbonate fuel cell integrated with a combustion powered turbine, engine, or other generator can be used to provide a different utility. Although power generation by the fuel cell is still desirable, the fuel cell can be operated, for instance, to improve and/or maximize the amount of $CO_2$ captured from an exhaust stream for a given volume of fuel cells. This can allow for improved $CO_2$ capture while still generating power from the fuel cell.

FIG. 1 provides a schematic overview for the concept of some aspects of the invention. FIG. 1 is provided to aid in understanding of the general concept, so additional feeds, processes, and or configurations can be incorporated into FIG. 1 without departing from the spirit of the overall concept. In the overview example shown in FIG. 1, a natural gas turbine 110 (or another combustion-powered turbine) can be used to generate electric power based on combustion of a fuel 112. For the natural gas turbine 110 shown in FIG. 1, this can include compressing an air stream or other gas phase stream 111 to form a compressed gas stream 113. The compressed gas stream 113 can then be introduced into a combustion zone 115 along with fuel 112. The resulting hot flue or exhaust gas 117 can then be passed into the expander portion of turbine 110 to generate electrical power.

After expansion (and optional clean up and/or other processing steps), the expanded flue gas can be passed into the cathode portion 120 of a molten carbonate fuel cell. The flue gas can include sufficient oxygen for the reaction at the cathode, or additional oxygen can be provided if necessary.

To facilitate the fuel cell reaction, fuel 132 can be passed into the anode portion 130 of the fuel cell, along with at least a portion of the anode exhaust. Prior to being recycled, the anode exhaust can be passed through a carbon dioxide separation system 140, such as a cryogenic carbon dioxide separator. This can remove at least a portion of $CO_2$ 147 from the anode exhaust, typically as well as a portion of the water 149 also. After removal of at least a portion of the $CO_2$ and water, the recycled anode exhaust can still contain some $CO_2$ and water, as well as unreacted fuel in the form of $H_2$ and/or possibly a hydrocarbon such as methane. Fuel 132 can represent a hydrogen-containing stream and/or a stream containing methane and/or another hydrocarbon that can be reformed (internally or externally) to form $H_2$. It is noted that, in FIG. 1. no pathway is available for $CO_2$ to re-enter the cathode portion of the fuel cell. Instead, $CO_2$ can be retained in the anode recycle loop until the $CO_2$ can be removed by carbon dioxide separation device 140.

The exhaust from the cathode portion 120 of the fuel cell can then be passed into a heat recovery zone 150 so that heat from the cathode exhaust can be recovered, e.g., to power a steam generator 160. After recovering heat, the cathode exhaust can exit the system as an exhaust stream 156. The exhaust stream 156 can exit to the environment, or optional additional clean-up processes can be used, such as performing additional $CO_2$ capture on stream 156, for example, using an amine scrubber.

Molten Carbonate Fuel Cell

In various aspects of the invention, a molten carbonate fuel cell (MCFC) can be used to facilitate separation of $CO_2$ from a $CO_2$-containing stream while also generating additional electrical power. The $CO_2$ separation can be further enhanced by taking advantage of synergies with the combustion-based power generator that can provide at least a portion of the input feed to the cathode portion of the fuel cell.

In this discussion, a fuel cell can correspond to a single cell, with an anode and a cathode separated by an electrolyte. The anode and cathode can receive input gas flows to facilitate the respective anode and cathode reactions for transporting charge across the electrolyte and generating electricity. A fuel cell stack can represent a plurality of cells in an integrated unit. Although a fuel cell stack can include multiple fuel cells, the fuel cells can typically be connected in parallel and can function (approximately) as if they collectively represented a single fuel cell of a larger size. When an input flow is delivered to the anode or cathode of a fuel cell stack, the fuel stack can include flow channels for dividing the input flow between each of the cells in the stack and flow channels for combining the output flows from the individual cells. In this discussion, a fuel cell array can be used to refer to a plurality of fuel cells (such as a plurality of fuel cell stacks) that are arranged in series, in parallel, or in any other convenient manner (e.g., in a combination of series and parallel). A fuel cell array can include one or more stages of fuel cells and/or fuel cell stacks, where the anode/cathode output from a first stage may serve as the anode/cathode output for a second stage. It is noted that the anodes in a fuel cell stage do not have to be connected in the same way as the cathodes in a stage. For convenience, the input to the first anode stage of a fuel cell array may be referred to as the anode input for the array, and the input to the first cathode stage of the fuel cell array may be referred to as the cathode input to the array. Similarly, the output from the final anode/cathode stage may be referred to as the anode/cathode output from the array.

It should be understood that reference to use of a fuel cell herein typically denotes a "fuel cell stack" composed of individual fuel cells, and more generally refers to use of one or more fuel cell stacks in fluid communication. Individual fuel cell elements (plates) can typically to be "stacked" together in a rectangular array called a "fuel cell stack". This fuel cell stack can typically take a feed stream and distribute reactants among all of the individual fuel cell elements and can then collect the products from each of these elements. When viewed as a unit, the fuel cell stack in operation can be taken as a whole even though composed of many (often tens or hundreds) of individual fuel cells. These individual fuel cells can typically have similar voltages (as the reactant and product concentrations are similar), and the total power output can result from the summation of all of the electrical currents in all of the cells. Stacks can also be arranged in a series/parallel arrangement to result in high voltages. If a sufficiently large volume fuel cell stack is available to process a given exhaust flow, the systems and methods described herein can be used with a single molten carbonate fuel cell stack. In other aspects of the invention, a plurality of fuel cell stacks may be desirable or needed for a variety of reasons.

For the purposes of this invention, unless otherwise specified, the term "fuel cell" should be understood to also refer to and/or is defined as including a reference to a fuel cell stack composed of set of one or more individual fuel cells for which there is a single input and output, as that is the manner in which fuel cells are typically employed in practice. Similarly, the term fuel cells (plural), unless otherwise specified, should be understood to also refer to and/or is defined as including a plurality of separate fuel cell stacks. In other words, all references within this document, unless specifically noted, can refer interchangeably to the operation of a fuel cell stack as a "fuel cell". For example, the volume of exhaust generated by a commercial scale combustion generator may be too large for processing by a fuel cell (i.e., a single stack) of conventional size. In order to process the full exhaust, a plurality of fuel cells (i.e., two or more separate fuel cells or fuel cell stacks) can be arranged in parallel, so that each fuel cell processes (roughly) an equal portion of the combustion exhaust. Although multiple fuel cells can be used, each fuel cell can be operated in a generally similar manner.

One way of characterizing the operation of a fuel cell can be to characterize the "utilization" of various inputs received by the fuel cell. For example, one common method for characterizing the operation of a fuel cell can be to specify the (anode) fuel utilization for the fuel cell.

Fuel cell fuel utilization as used herein can be computed using the flow rates and Lower Heating Value (LHV) of the fuel components entering and leaving the fuel cell anode. Lower heating value is defined as the enthalpy of combustion of a fuel component to vapor to phase, fully oxidized products (i.e., vapor phase $CO_2$ and $H_2O$ product). As such, fuel utilization ($U_f$) can be computed as $U_f$=(LHV(in)−LHV(out))/LHV(in), where LHV(in) and LHV(out) refer to the LHV of the fuel components (such as $H_2$, $CH_4$, and/or CO) in the anode inlet and outlet streams or flows, respectively. In this definition, the LHV of a stream or flow may be computed as a sum of values for each fuel component in the input and/or output stream. The contribution of each fuel component to the sum can correspond to the fuel component's flow rate (e.g., mol/hr) multiplied by the fuel component's LHV (e.g., joules/mol). It is noted that components in the anode input flow that do not participate in a combustion reaction to form $H_2O$ and/or $CO_2$ are not typically considered "fuel components".

It is noted that, for the special case where the only fuel in the anode input flow is $H_2$, the only reaction involving a fuel component that can take place in the anode represents the conversion of $H_2$ into $H_2O$. In this special case, the fuel utilization simplifies to ($H_2$-rate-in minus $H_2$-rate-out)/$H_2$-rate-in. In such a case, $H_2$ would be the only fuel component, and so the $H_2$ LHV would cancel out of the equation. In the more general case, the anode feed may contain, for example, $CH_4$, $H_2$, and CO in various amounts. Because these species can typically be present in different amounts in the anode outlet, the summation as described above can be needed to determine the fuel utilization.

In addition to fuel utilization, the utilization for other reactants in the fuel cell can be characterized. For example, the operation of a fuel cell can additionally or alternately be characterized with regard to "$CO_2$ utilization" and/or "oxidant" utilization. The values for $CO_2$ utilization and/or oxidant utilization can be specified in a similar manner. For $CO_2$ utilization, the simplified calculation of ($CO_2$-rate-in minus $CO_2$-rate-out)/$CO_2$-rate-in can be used if $CO_2$ is the only fuel component present in the input stream or flow to the cathode, with the only reaction thus being the formation of $CO_3^{2-}$. Similarly, for oxidant utilization, the simplified version can be used if $O_2$ is the only oxidant present in the input stream or flow to the cathode, with the only reaction thus being the formation of $CO_3^{2-}$.

Another reason for using a plurality of fuel cells can be to allow for efficient fuel cell operation while reducing the $CO_2$ content of the combustion exhaust to a desired level. Rather than operating a fuel cell to have a high (or optimal) rate of $CO_2$ utilization, two (or more) fuel cells can be operated at lower fuel utilization rate(s) while reducing the combustion to a desired level.

Figure 2:
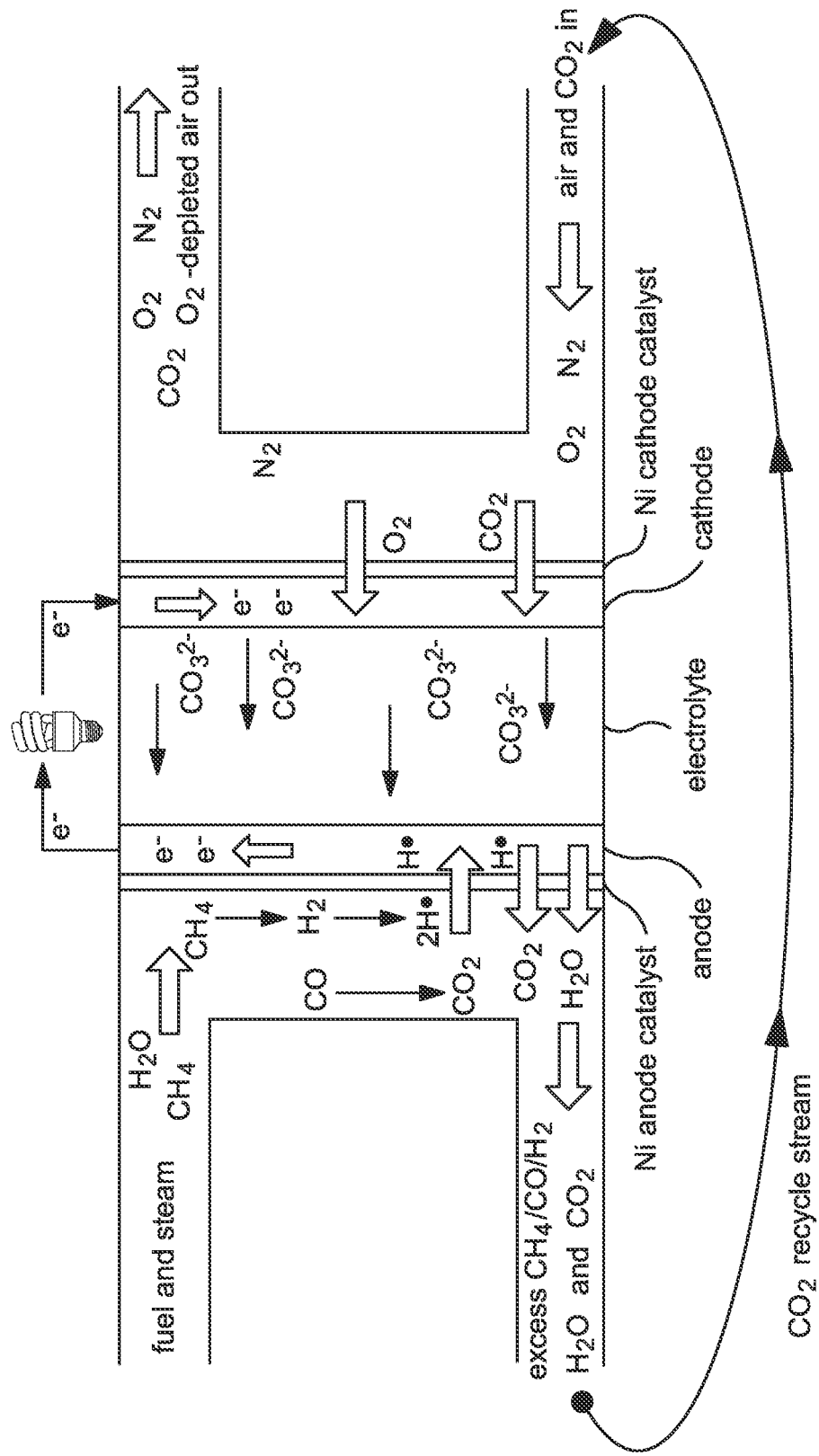
FIG. 2 schematically shows an example of the operation of a molten carbonate fuel cell.

FIG. 2 shows a schematic example of the operation of an MCFC for generation of electrical power. In FIG. 2, the anode portion of the fuel cell can receive fuel and steam ($H_2O$) as inputs, with outputs of water, $CO_2$, and optionally excess $H_2$, $CH_4$ (or other hydrocarbons), and/or CO. The cathode portion of the fuel cell can receive $CO_2$ and some oxidant (e.g., air/$O_2$) as inputs, with an output corresponding to a reduced amount of $CO_2$ in $O_2$-depleted oxidant (air). Within the fuel cell, $CO_3^{2-}$ ions formed in the cathode side can be transported across the cathode (membrane), through the electrolyte in the fuel cell, and across the anode (membrane) to provide the carbonate ions needed for the reactions occurring at the anode.

In a molten carbonate fuel cell such as the example fuel cell shown in FIG. 2, there are three basic reactions that can occur. The first reaction can be optional, and can be reduced or eliminated if sufficient $H_2$ is provided directly to the anode.

  (1)

  (2)

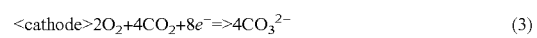  (3)

Reaction (1) represents a hydrocarbon reforming reaction to generate $H_2$ for use in the anode of the fuel cell. Reaction (1) can occur external to the fuel cell, and/or the reforming can be performed internal to the fuel cell. Reaction (1) can be optional, as the primary purpose of reaction (1) is to generate $H_2$. The $CO_2$ generated by reaction (1) does not generally undergo further reaction within the fuel cell, and, to a first approximation, thus does not significantly impact reaction (2).

Reactions (2) and (3), at the anode and cathode respectively, represent the reactions that can result in electrical power generation within the fuel cell. Reaction (2) combines $H_2$, optionally generated by reaction (1), with carbonate ions to form $H_2O$, $CO_2$, and electrons. Reaction (3) combines $O_2$, $CO_2$, and electrons to form carbonate ions. The carbonate ions generated by reaction (3) can be transported across the electrolyte of the fuel cell to provide the carbonate ions needed for reaction (2). In combination with the transport of carbonate ions across the electrolyte, a closed current loop can then be formed by providing an electrical connection between the anode and cathode.

During conventional operation of a fuel cell, such as standalone operation, the goal of operating the fuel cell can be to generate electrical power while efficiently using the "fuel" provided to the cell. The "fuel" can correspond to either hydrogen ($H_2$), a gas stream comprising hydrogen, and/or a gas stream comprising a substance that can be reformed to provide hydrogen (such as methane, another alkane or hydrocarbon, and/or one or more other types of compounds containing carbon and hydrogen that, upon reaction, can provide hydrogen). These reforming reactions are typically endothermic and thus usually consume some heat energy in the production of hydrogen. Carbon sources that can provide CO directly and/or upon reaction can also be utilized, as typically the water gas shift reaction ($CO+H_2O=H_2+CO_2$) can occur in the presence of the fuel cell anode catalyst surface. This can allow for production of hydrogen from a CO source. For such conventional operation, one potential goal of operating the fuel cell can be to consume all of the fuel provided to the cell, while maintaining a desirable output voltage for the fuel cell, which can be traditionally accomplished by operating the fuel cell anode at a fuel utilization of about 70% to about 75%, followed by oxidizing (such as burning) the remaining fuel to generate heat to maintain the temperature of the fuel cell.

By contrast, in various embodiments, the goal of operating the fuel cell can be to separate $CO_2$ from the output stream of a combustion reaction, in addition to allowing generation of electric power. In such embodiments, the combustion reaction(s) can be used to power one or more generators or turbines, which provide the majority of the power generated by the combined generator/fuel cell system. Rather than operating the fuel cell to optimize power generation by the fuel cell, the system can instead be operated to improve the capture of carbon dioxide from the combustion-powered generator while reducing and/or minimizing the number of fuels cells required for capturing the carbon dioxide. Selecting an appropriate configuration for the input and output flows of the fuel cell, as well as selecting appropriate operating conditions for the fuel cell, can allow for a desirable combination of overall power generation efficiency and carbon capture. One aspect of selecting appropriate operating conditions can correspond to selecting operating conditions based on a factor other than fuel utilization. In terms of fuel utilization, the operating conditions can result in lower fuel utilization than in a conventional fuel cell.

In various aspects of the invention where fuel cells are operated to have a low fuel utilization, a molten carbonate fuel cell can be operated to have a fuel utilization of about 65% or less, for example, about 60% or less, about 55% or less, about 50% or less, or about 45% or less. Additionally or alternately, a molten carbonate fuel cell can be operated to have a fuel utilization of at least about 25%, for example at least about 30%, at least about 35%, or at least about 40%.

In some embodiments, the fuel cells in a fuel cell array can be arranged so that only a single stage of fuel cells (such as fuel cell stacks) can be present. In this type of embodiment, the anode fuel utilization for the single stage can represent the anode fuel utilization for the array. Another option can be that a fuel cell array can contain multiple stages of anodes and/or multiple stages of cathodes, with each anode stage having a fuel utilization within the same range, such as each anode stage having a fuel utilization within 10% of a specified value, for example within 5% of a specified value. Still another option can be that each anode stage can have a fuel utilization equal to a specified value or lower than the specified value by less than an amount, such as having each anode stage be not greater than a specified value by 10% or less, for example, by 5% or less. As an illustrative example, a fuel cell array with a plurality of anode stages can have each anode stage be within about 10% of 50% fuel utilization, which would correspond to each anode stage having a fuel utilization between about 40% and about 60%. As another example, a fuel cell array with a plurality of stages can have each anode stage be not greater than 60% anode fuel utilization with the maximum deviation being about 5% less, which would correspond to each anode stage having a fuel utilization between about 55% to about 60%. In still another example, one or more stages of fuel cells in a fuel cell array can be operated at a fuel utilization from about 30% to about 50%, such as operating a plurality of fuel cell stages in the array at a fuel utilization from about 30% to about 50%. More generally, any of the above types of ranges can be paired with any of the anode fuel utilization values specified herein.

Still another option can include specifying a fuel utilization for less than all of the anode stages. For example, in some aspects of the invention where fuel cells/stacks are arranged at least partially in one or more series arrangements, that anode fuel utilization can be specified for the first anode stage in a series, the second anode stage in a series, the final anode stage in a series, or any other convenient anode stage in a series. As used herein, the "first" stage in a series corresponds to the stage (or set of stages, if the arrangement contains parallel stages as well) to which input is directly fed from the fuel source(s), with later ("second", "third", "final", etc.) stages representing the stages to which the output from one or more previous stages is fed, instead of directly from the respective fuel source(s). In situations where both output from previous stages and input directly from the fuel source(s) are co-fed into a stage, there can be a "first" (set of) stage(s) and a "last" (set of) stage(s), but other stages ("second", "third", etc.) can be more tricky among which to establish an order (e.g., in such cases, ordinal order can be determined by concentration levels of one or more components in the composite input feed composition, such as $CO_2$ for instance, from highest concentration "first" to lowest concentration "last" with approximately similar compositional distinctions representing the same ordinal level.

Yet another option can be to specify the anode fuel utilization corresponding to a particular cathode stage (again, where fuel cells/stacks are arranged at least partially in one or more series arrangements). As noted above, based on the direction of the flows within the anodes and cathodes, the first cathode stage may not correspond to (be across the same fuel cell membrane from) the first anode stage. Thus, in some aspects of the invention, the anode fuel utilization can be specified for the first cathode stage in a series, the second cathode stage in a series, the final cathode stage in a series, or any other convenient cathode stage in a series.

Yet still another option can be to specify an overall average of fuel utilization over all fuel cells in a fuel cell array. In various aspects, the overall average of fuel utilization for a fuel cell array can be about 65% or less, for example, about 60% or less, about 55% or less, about 50% or less, or about 45% or less (additionally or alternately, the overall average fuel utilization for a fuel cell array can be at least about 25%, for example at least about 30%, at least about 35%, or at least about 40%). Such an average fuel utilization need not necessarily constrain the fuel utilization in any single stage, so long as the array of fuel cells meets the desired fuel utilization.

In a molten carbonate fuel cell, the transport of carbonate ions across the electrolyte in the fuel cell can provide a method for transporting $CO_2$ from a first flow path to a second flow path, where the transport method can allow transport from a lower concentration (the cathode) to a higher concentration (the anode), which can thus facilitate capture of $CO_2$. For embodiments where the input to the cathode can be primarily based on the output gas from a combustion reaction for powering a turbine or another type of power generator, the $CO_2$ content of the output gas can tend to be relatively low in comparison to the total output gas composition. For example, the $CO_2$ content of the output from a natural gas combustion turbine can be from about 3 vol % to about 6 vol %, although higher $CO_2$ contents can be possible, e.g., for turbine configurations including exhaust gas recovery. Coal-fired power plants can have higher $CO_2$ concentrations, such as up to about 15 vol % or more. For such output flows, the majority of the gas in the output flow can be nitrogen, especially if the source of oxidant for the combustion reaction is air or a primarily nitrogen-containing gas. Due to the relatively low concentration of $CO_2$, one of the challenges in separating out the $CO_2$ from such streams can be related to performing a cost-effective separation resulting in a relatively high purity $CO_2$ output stream. An MCFC can be beneficial for performing this type of separation, as part of the selectivity of the fuel cell can be based on the electrochemical reactions allowing the cell to generate electrical power. For non-reactive species (such as $N_2$) that effectively do not participate in the electrochemical reactions within the fuel cell, there can be an insignificant amount of reaction and transport from cathode to anode. By contrast, the potential (voltage) difference between the cathode and anode can provide a strong driving force for transport of carbonate ions across the fuel cell. As a result, the transport of carbonate ions in the molten carbonate fuel cell can allow $CO_2$ to be transported from the cathode (lower $CO_2$ concentration) to the anode (higher $CO_2$ concentration) with relatively high selectivity.

Operation of Anode Portion and Anode Recycle Loop

In various aspects of the invention, molten carbonate fuel cells can be operated under conditions that allow for lower fuel utilization in the anode portion of the fuel cell. This is in contrast to conventional operation for fuel cells, where the fuel utilization is typically selected in order to allow all of the fuel delivered to the fuel cell to be consumed as part of operation of the fuel cell. In conventional operation, all of the fuel is typically either consumed within the anode of the fuel cell or burned to provide sensible heat for the feed streams to the fuel cell.

Figure 3:
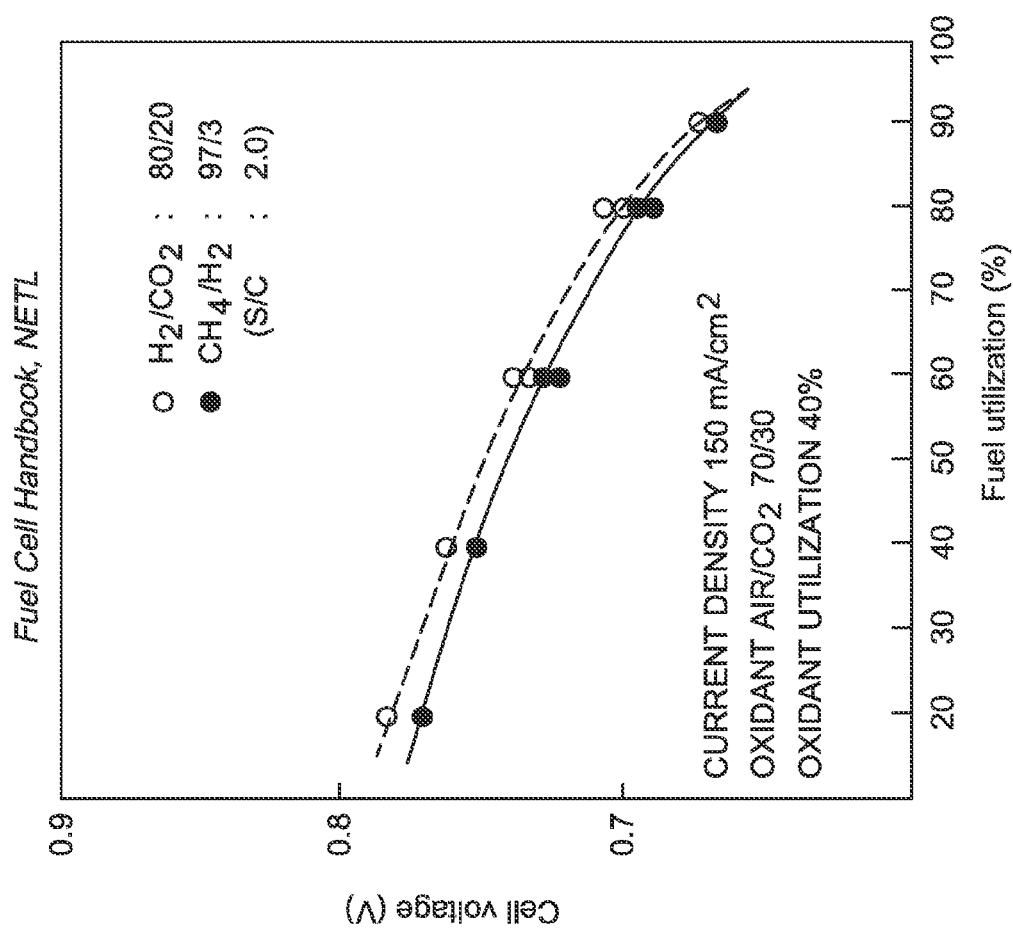
FIG. 3 shows an example of the relation between anode fuel utilization and voltage for a molten carbonate fuel cell.

FIG. 3 shows an example of the relationship between fuel utilization and output power for a fuel cell operating under conventional (stand-alone) conditions. The diagram shown in FIG. 3 shows two limiting cases for operation of a fuel cell. One limiting case includes the limit of operating a fuel cell to consume an amount of fuel (such as $H_2$ or methane reformed into $H_2$) that approaches 100% of the fuel delivered to the fuel cell. From an efficiency standpoint, consumption of ~100% of the fuel delivered to a fuel cell would be desirable, so as not to waste fuel during operation of the fuel cell. However, there are two potential drawbacks with operating a fuel cell to consume more than about 80% of the fuel delivered to the cell. First, as the amount of fuel consumed approaches 100%, the voltage provided by the fuel cell can be sharply reduced. In order to consume an amount of fuel approaching 100%, the concentration of the fuel in the fuel cell (or at least near the anode) must almost by definition approach zero during at least part of the operation of the fuel cell. Operating the anode of the fuel cell with a fuel concentration approaching zero can result in a decreasingly low driving force for transporting carbonate across the electrolyte of the fuel cell. This can cause a corresponding drop in voltage, with the voltage potentially also approaching zero in the true limiting case of consuming all fuel provided to the anode.

The second drawback is also related to relatively high fuel utilization values (greater than about 80%) even if consumption does not approach 100%. As shown in FIG. 3, at fuel utilization values of about 75% or less, the voltage generated by the fuel cell has a roughly linear relationship with the fuel utilization. At about 75% fuel utilization, the voltage generated can be about 0.7 Volts, with mildly increasing voltages as the fuel utilization decreases. At fuel utilization values of about 80% or greater, the voltage versus utilization curve appears to take on an exponential or power type relationship. From a process stability standpoint, it can be preferable to operate a fuel cell in a portion of the voltage versus utilization curve where the relationship is linear.

In the other limiting case shown in FIG. 3, the voltage generated by a molten carbonate fuel cell shows a mild increase as the fuel utilization decreases. However, in conventional operation, operating a fuel cell at reduced utilization can pose various difficulties. For example, the total amount of fuel delivered to a conventionally operated fuel cell operated with lower fuel utilization may need to be reduced, so that whatever fuel remains in the anode exhaust/output stream can still provide the appropriate amount of heat (upon further combustion) for maintaining the fuel cell temperature. If the fuel utilization is reduced without adjusting the amount of fuel delivered to the fuel cell, the oxidation of the unused fuel may result in higher than desired temperatures for the fuel cell. Based at least on these limiting case considerations, conventional fuel cells are typically operated at a fuel utilization of about 70% to about 75%, so as to achieve heat balance with complete utilization of the fuel.

In contrast to conventional operation, in various embodiments of the invention, the operating conditions for one or more molten carbonate fuel cells can be selected based on having independent input streams for the anode and cathode portions of a fuel cell. Instead of using the anode exhaust to feed the cathode and/or to heat the fuel cell, the anode and cathode portions of the fuel cell can be operated separately, or at least without any direct or indirect feedback between the cathode input/output and anode input/output. This can facilitate increased carbon dioxide removal in one or more ways. First, the amount of fuel utilization in the anode can be selected without having to consider the overall consumption of the fuel provided as an anode input. This can allow the fuel utilization to be selected based on other considerations, such as providing excess fuel to increase the driving force for transport of $CO_3^{2-}$ across the electrolyte. Additionally or alternately, avoiding direct and/or indirect feedback between the cathode input/output and the anode input/output can reduce and/or minimize the amount of $CO_2$ transferred from the anode exhaust back to the cathode, thus requiring the $CO_2$ to be captured again in the fuel cell.

One configuration feature that can assist with operating a fuel cell for reduced fuel utilization and improved $CO_2$ capture can be to recycle at least a portion of the exhaust from a fuel cell anode to the input of a fuel cell anode. The output stream from an MCFC anode can include $H_2O$, $CO_2$, optionally CO, and optionally but typically unreacted fuel (such as $H_2$ or $CH_4$) as the primary output components. Instead of using this output stream as a fuel source to provide heat for a reforming reaction, one or more separations can be performed on the anode output stream in order to separate out the $CO_2$ from the components with potential fuel value, such as $H_2$ and/or CO. The components with fuel value can then be recycled to the input of an anode.

This type of configuration can provide one or more benefits. First, $CO_2$ can be separated out from the anode output, such as by using a cryogenic $CO_2$ separator. Several of the components of the anode output ($H_2$, CO, $CH_4$) are not easily condensable components, while $CO_2$ and $H_2O$ can be separated individually as condensed phases. Depending on the embodiment, at least about 90 vol % of the $CO_2$ in the anode output can be separated out to form a relatively high purity $CO_2$ output stream. After separation, the remaining portion of the anode output can correspond primarily to components with fuel value, as well as reduced amounts of $CO_2$ and/or $H_2O$. This portion of the anode output after separation can be recycled for use as part of the anode input, along with additional fuel. In this type of configuration, even though the fuel utilization in a single pass through the MCFC(s) may be low, the unused fuel can be advantageously recycled for another pass through the anode. As a result, the single-pass fuel utilization can be at a reduced level, while avoiding loss (exhaust) of unburned fuel to the environment.

The amount of $H_2$ present in the anode output can be increased, for example, by using a water gas shift reactor to convert $H_2O$ and CO present in the anode output into $H_2$ and $CO_2$. Water is an expected output of the reaction occurring at the anode, so the anode output can typically have an excess of $H_2O$ relative to the amount of CO present in the anode output. CO can be present in the anode output due to incomplete carbon combustion during reforming and/or due to the equilibrium balancing reactions between $H_2O$, CO, $H_2$, and $CO_2$ (i.e., the water-gas shift equilibrium) under either reforming conditions or the conditions present during the anode reaction. A water gas shift reactor can be operated under conditions to drive the equilibrium further in the direction of forming $CO_2$ and $H_2$ at the expense of CO and $H_2O$. Higher temperatures can tend to favor the formation of CO and $H_2O$. Thus, one option for operating the water gas shift reactor can be to expose the anode output stream to a suitable catalyst, such as a catalyst including iron oxide, zinc oxide, copper on zinc oxide, or the like, at a suitable temperature, e.g., between about 190° C. to about 210° C. Optionally, the water-gas shift reactor can include two stages for reducing the CO concentration in an anode output stream, with a first higher temperature stage operated at a temperature from at least about 300° C. to about 375° C. and a second lower temperature stage operated at a temperature of about 225° C. or less, such as from about 180° C. to about 210° C. In addition to increasing the amount of $H_2$ present in the anode output, the water-gas shift reaction can also increase the amount of $CO_2$ at the expense of CO. This can exchange difficult-to-remove carbon monoxide (CO) for carbon dioxide, which can be more readily removed by condensation (e.g., cryogenic removal), chemical reaction (such as amine removal), and/or other $CO_2$ removal methods.

Although the anode recycle loop can enable lower fuel utilization without concomitant loss of fuel to the environment, the excess fuel in the recycle loop can result in other consequences. For example, if using a cryogenic method for separating $CO_2$ from the anode exhaust, the anode exhaust stream can typically be compressed as part of the separation process. If fuel utilization is relatively high, the anode exhaust can be primarily composed of typical combustion products, such as $CO_2$, CO, and $H_2O$. However, any unused fuel, such as $H_2$ can also be in the exhaust. This additional $H_2$ can also require compression during separation of $CO_2$. Compression of any additional gas requires additional energy. The amount of this additional energy can be increased when $H_2$ is the additional gas, due to the known difficulties in compressing $H_2$. At a conventional fuel utilization value of about 75%, the $CO_2$ content in the anode exhaust can be at least as great as the amount of $H_2$ in the exhaust, and preferably the $CO_2$ content can be at least twice the $H_2$ content. By contrast, at a fuel utilization value of about 50% or less, about half or more of the anode exhaust can correspond to $H_2$. Compression of this additional gas not separated out can require significant additional energy.

In some aspects of the invention, all or substantially all of the anode output stream remaining after separation of portions of the $CO_2$ (and $H_2O$) can be recycled for use as an input for an anode. Alternatively, the anode output stream after separation can be used for more than one purpose, but recycle of any portion of the anode output stream for use as a direct input to a cathode and/or as an input to an oxidizer for heating of the fuel cell can advantageously be avoided. Controlling the use of the anode output stream can provide several advantages. For example, by avoiding recycle of the anode output for use as an input to a cathode, the transport of $CO_2$ within the system can be limited to transport from the fuel cell cathode to the fuel cell anode. In other words, once $CO_2$ can be "captured" within the anode loop portion of the system, the $CO_2$ cannot return to the cathode portion of the system, e.g., where the $CO_2$ might be exhausted to the atmosphere and/or might have to be captured by an auxiliary carbon capture device. Instead, any $CO_2$ "captured" within the anode loop can remain in the anode loop until the $CO_2$ can be separated out, e.g., to form a high purity $CO_2$ stream.

In addition to compression of excess fuel, particularly in configurations where all or substantially all of the anode output stream is recycled to the anode input, compression of inert or non-reactive gases in the anode recycle loop can result in significant consumption of energy. In an anode recycle loop, a majority (such as up to 90% or more) of the condensable components such as $CO_2$ and $H_2O$ can be removed during each cycle through the anode recycle loop. Components that can participate in the reactions in the reformer and/or anode, such as $CH_4$, $H_2$, and CO, can also be at least partially consumed during each cycle through the anode recycle loop. However, the input fuel to an anode recycle loop can typically be a fuel containing other non-reactive species. For example, if a natural gas stream is used as a fuel, a typical natural gas stream can contain about 1% to 5% (or more) of $N_2$. This $N_2$ does not generally react in the anode and can be removed in only minimal quantities in the separation stages. As a result, a substantial quantity of $N_2$ can accumulate in the anode recycle loop. While a bleed stream can be used to remove a portion of $N_2$ during each recycle, such a bleed stream can also result in loss of the fuel gases present in the anode recycle loop. The excess non-reactive gases in the anode recycle loop can further contribute to the energy costs for compression in the recycle loop. The additional costs for compression of gases in the recycle loop can reduce and/or mitigate the benefits of low fuel utilization in the anode by reducing the overall electrical efficiency of the system.

Figure 4:
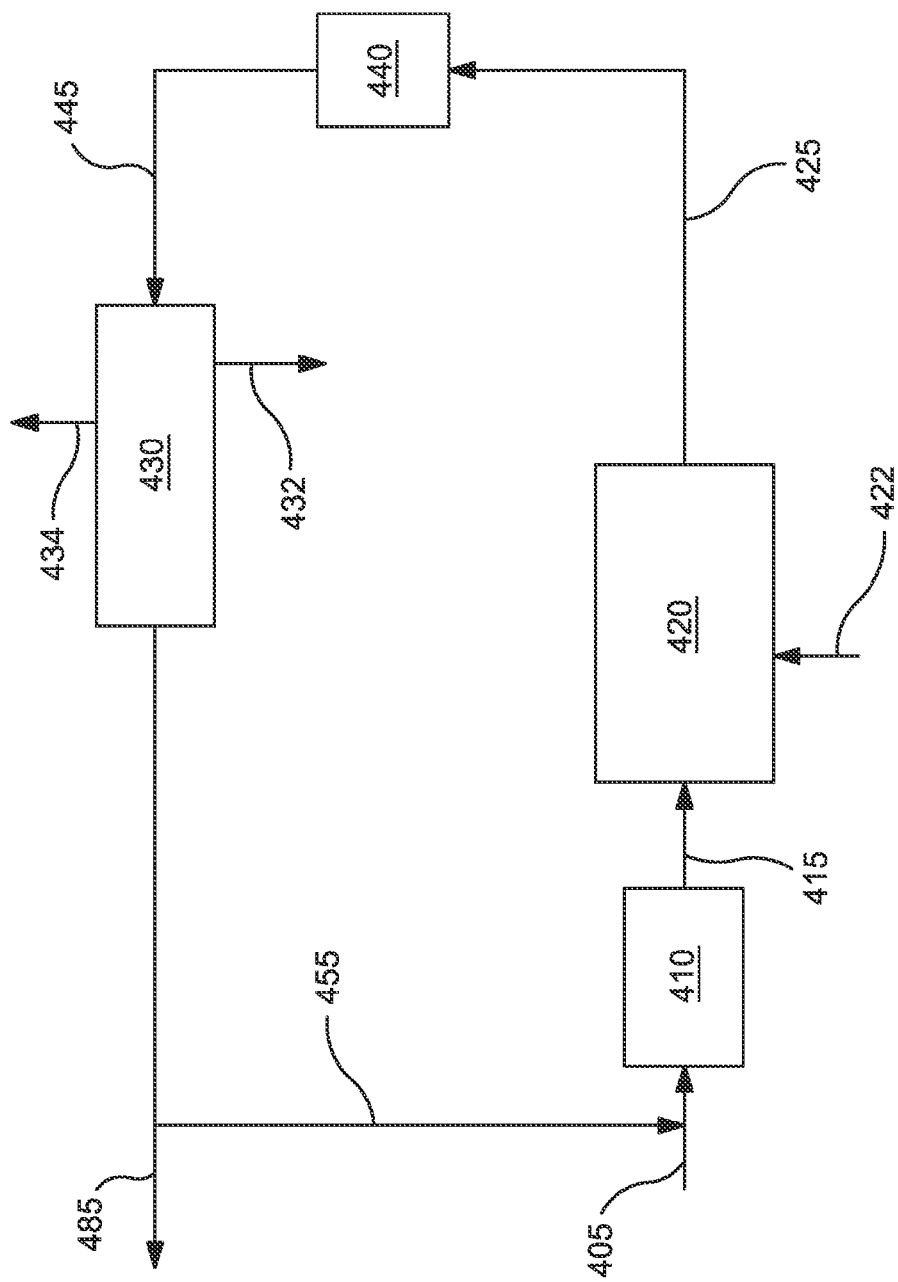
FIG. 4 schematically shows an example of a configuration for an anode recycle loop.

FIG. 4 shows an example of the anode flow path portion of a generator/fuel cell system according to the invention. In FIG. 4, an initial fuel stream 405 can optionally be reformed 410 to convert methane (or another type of fuel) and water into $H_2$ and $CO_2$. Alternatively, the reforming reaction can be performed in a reforming stage that is part of an assembly including both the reforming stage and the fuel cell anode 420. Additionally or alternately, at least a portion of fuel stream 405 can correspond to hydrogen gas, so that the amount of reforming needed to provide fuel to the anode 420 can be reduced and/or minimized. The optionally reformed fuel 415 can then be passed into anode 420. A recycle stream 455 including fuel components from the anode exhaust 425 can also serve as an input to the anode 420. A flow of carbonate ions 422 from the cathode portion of the fuel cell (not shown) can provide the remaining reactant needed for the anode fuel cell reactions. Based on the reactions in the anode 420, the resulting anode exhaust 425 can include $H_2O$, $CO_2$, one or more components corresponding to unreacted fuel ($H_2$, CO, $CH_4$, or others), and optionally one or more additional non-reactive components, such as $N_2$ and/or other contaminants that are part of fuel stream 405. The anode exhaust 425 can then be passed into one or more separation stages 430 for removal of $CO_2$ (and optionally also $H_2O$). A cryogenic $CO_2$ removal system can be an example of a suitable type of separation stage. Optionally, the anode exhaust can first be passed through a water gas shift reactor 440 to convert any CO present in the anode exhaust (along with some $H_2O$) into $CO_2$ and $H_2$ in an optionally water gas shifted anode exhaust 445.

An initial portion of the separation stage(s) 430 can be used to remove a majority of the $H_2O$ present in the anode exhaust 425 as an $H_2O$ output stream 432. A cryogenic $CO_2$ removal system can then remove a majority of the $CO_2$ as a high purity $CO_2$ stream 434. A purge stream (not shown) can also be present, if desired, to prevent accumulation of inert gases within the anode recycle loop. The remaining portion 455 of the anode exhaust stream can then be returned to the inlet of anode 420.

As noted in FIG. 4, reforming of fuel can be performed external to a fuel cell and/or internal to a fuel cell. Another option can be to reduce, minimize, or even eliminate reforming performed prior to having fuel enter the fuel cell anode. When a sufficient amount of $H_2$ is present in the anode feed, such as at least about 10 vol % of the fuel delivered to the anode in the form of $H_2$, the reaction conditions in the anode can allow for additional reforming to take place within the anode itself. As a result, conventionally the fuel to the anode can undergo reforming prior to entering the anode, e.g., in order to provide a sufficient initial amount of $H_2$. If the anode feed does not contain a sufficient amount of hydrogen, the anode reaction can stall, and reforming activity in the anode can be reduced, minimized, or halted entirely.

In conventional operation, at least a portion of the fuel delivered to an MCFC anode can be reformed in order to provide $H_2$ for maintaining the anode reaction. However, when the anode exhaust is recycled to the anode inlet, sufficient $H_2$ can be present in the stream to the anode input without any reforming. Instead, the $H_2$ from the recycle stream can allow the anode reaction to be maintained so that additional reforming can occur within the anode itself.

Because reforming is typically an endothermic process, maintaining the temperature for reforming in a reforming stage prior to the anode can typically require additional heat and therefore fuel. Eliminating the need for a reforming stage prior to the anode input can improve the overall efficiency of the power generation system by eliminating the heat requirements for the reforming stage. Thus, in addition to allowing for a reduced fuel cell area, the combination of recycling the anode output to the anode input and operating the fuel cell with low fuel utilization can allow for improved power generation efficiency.

Operation of Cathode Portion

In various aspects according to the invention, molten carbonate fuel cells used for carbon capture can be operated to improve or enhance the carbon capture aspects of the fuel cells, as opposed to (or even at the expense of) enhancing the power generation capabilities. Conventionally, a molten carbonate fuel cell can be operated based on providing a desirable voltage while consuming all fuel in the fuel stream delivered to the anode. This can be conventionally achieved in part by using the anode exhaust as at least a part of the cathode input stream. By contrast, the present invention uses separate/different sources for the anode input and cathode input. By removing the link between the composition of the anode input flow and the cathode input flow, additional options become available for operating the fuel cell to improve capture of carbon dioxide.

Figure 5:
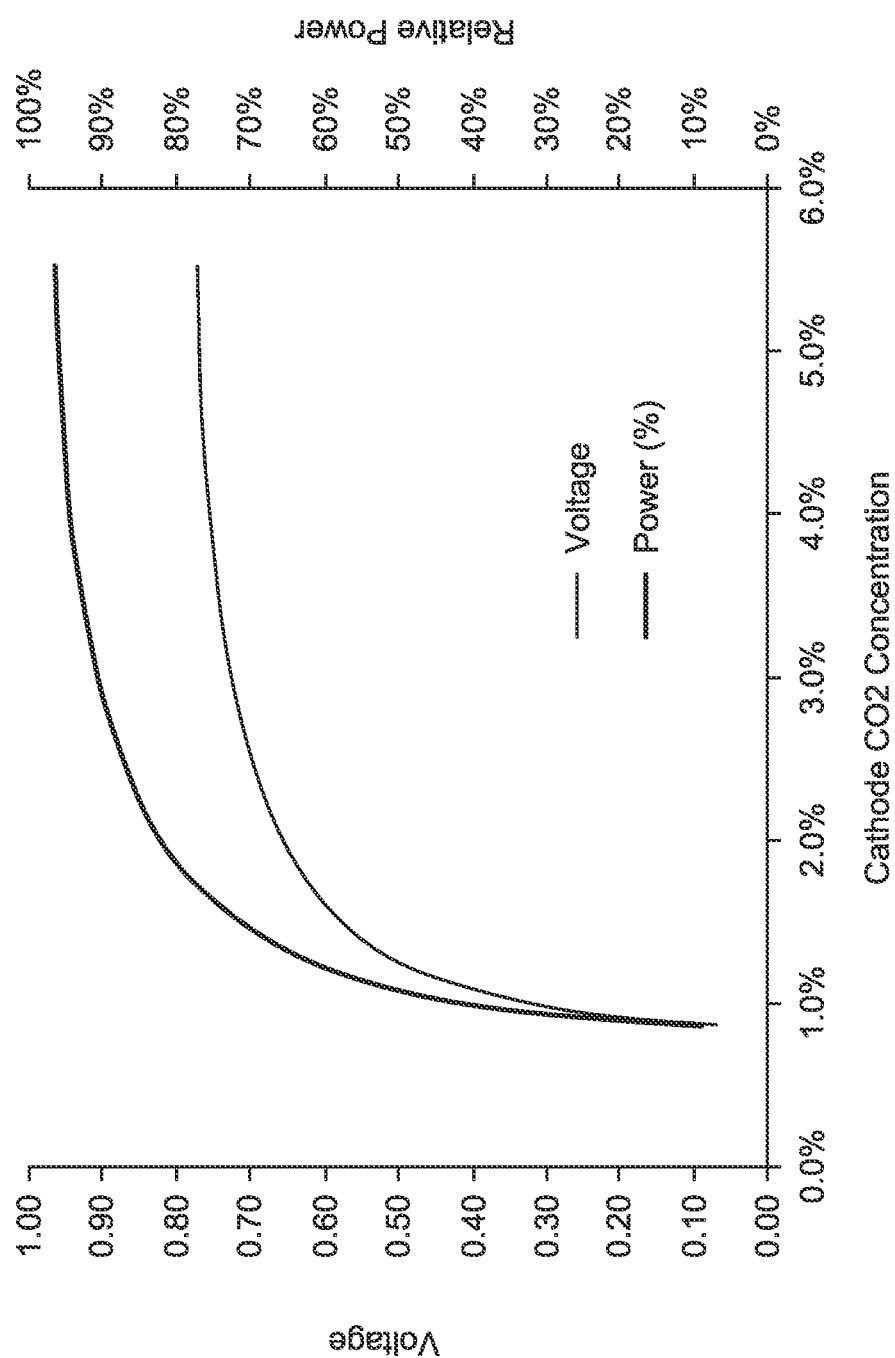
FIG. 5 shows an example of the relation between $CO_2$ utilization, voltage, and power for a molten carbonate fuel cell.

One initial challenge in using molten carbonate fuel cells for carbon dioxide removal can be that the fuel cells have limited ability to remove carbon dioxide from relatively dilute cathode feeds. FIG. 5 shows an example of the relationship between 1) voltage and $CO_2$ concentration and 2) power and $CO_2$ concentration, based on the concentration of $CO_2$ in the to cathode input gas. As shown in FIG. 5, the voltage and/or power generated by a carbonate fuel cell can start to drop rapidly as the $CO_2$ concentration falls below about 2.0 vol %. As the $CO_2$ concentration drops further, e.g., to below 1.0 vol %, at some point the voltage across the fuel cell can become low enough that little or no further transport of carbonate may occur. Thus, at least some $CO_2$ is likely to be present in the exhaust gas from the cathode stage of a fuel cell, pretty much regardless of the operating conditions.

One modification of the fuel cell operating conditions can be to operate the fuel cell with an excess of available reactants at the anode, such as by operating with low fuel utilization at the anode, as described above. By providing an excess of the reactants for the anode reaction in the fuel cell, the availability of $CO_2$ for the cathode reaction can be used as a/the rate limiting variable for the reaction.

When operating MCFCs to enhance the amount of carbon capture, the factors for balancing can be different than when attempting to improve fuel utilization. In particular, the amount of carbon dioxide delivered to the fuel cells can be determined based on the output flow from the combustion generator providing the $CO_2$-containing stream. To a first approximation, the $CO_2$ content of the output flow from a combustion generator can be a minor portion of the flow. Even for a higher $CO_2$ content exhaust flow, such as the output from a coal-fired combustion generator, the $CO_2$ content from most commercial coal fired power plants can be about 15 vol % or less. In order to perform the cathode reaction, this could potentially include between about 5% and about 15%, typically between about 7% and about 9%, of oxygen used to react with the $CO_2$ to form carbonate ions. As a result, less than about 25 vol % of the input stream to the cathode can typically be consumed by the cathode reactions. The remaining at least about 75% portion of the cathode flow can be comprised of inert/non-reactive species such as $N_2$, $H_2O$, and other typical oxidant (air) components, along with any unreacted $CO_2$ and $O_2$.

Based on the nature of the input flow to the cathode relative to the cathode reactions, the portion of the cathode input consumed and removed at the cathode can be about 25 vol % or less, for example about 10 vol % or less for input flows based on combustion of cleaner fuel sources, such as natural gas sources. The exact amount can vary based on the fuel used, the diluent content in the input fuel (e.g., $N_2$ is typically present in natural gas at a small percentage), and the oxidant (air) to fuel ratio at which the combustor is operated, all of which can vary, but are typically well known for commercial operations. As a result, the total gas flow into the cathode portions of the fuel cells can be relatively predictable (constant) across the total array of fuel cells used for carbon capture. Several possible configurations can be used in order to provide an array of fuel cells to enhance/improve/optimize carbon capture. The following configuration options can be used alone or in combination as part of the strategy for improving carbon capture.

A typical configuration option can be to divide the $CO_2$-containing stream between a plurality of fuel cells. The $CO_2$-containing output stream from an industrial generator can typically correspond to a large flow volume relative to desirable operating conditions for a single MCFC of reasonable size. Instead of processing the entire flow in a single MCFC, the flow can be divided amongst a plurality of MCFC units, usually at least some of which are in parallel, so that the flow rate in each unit can be within a desired flow range.

Additionally or alternately, fuel cells can be utilized in series to successively remove $CO_2$ from a flow stream. Regardless of the number of initial fuel cells to which a $CO_2$-containing stream can be distributed to in parallel, each initial fuel cell can be followed by one or more additional cells in series to further remove additional $CO_2$. Similar to the situation demonstrated in FIG. 3 for the $H_2$ input to the anode, attempting to remove $CO_2$ within a stream in a single fuel cell could lead to a low and/or unpredictable voltage output. Rather than attempting to remove $CO_2$ to a desired level in a single fuel cell, $CO_2$ can be removed in successive cells until a desired level can be achieved. For example, each cell in a series of fuel cells can be used to remove some percentage (e.g., about 50%) of the $CO_2$ present in a fuel stream. In such an example, if three fuel cells are used in series, the $CO_2$ concentration can be reduced (e.g., to about 15% or less of the original amount present, which can correspond to reducing the $CO_2$ concentration from about 6% to about 1% or less over the course of three fuel cells in series).

Further additionally or alternately, the operating conditions can be selected in early fuel stages in series to provide a desired output voltage while the array of stages can be selected to achieve a desired level of carbon capture. As an example, an array of fuel cells can be used with three fuel cells in series. The first two fuel cells in series can be used to remove $CO_2$ while maintaining a desired output voltage. The final fuel cell can then be operated to remove $CO_2$ to a desired concentration.

Still further additionally or alternately, there can be separate connectivity for the to anodes and cathodes in a fuel cell array. For example, if the fuel cell array includes fuel cathodes connected in series, the corresponding anodes can be connected in any convenient manner, not necessarily matching up with the same arrangement as their corresponding cathodes, for example. This can include, for instance, connecting the anodes in parallel, so that each anode receives the same type of fuel feed, and/or connecting the anodes in a reverse series, so that the highest fuel concentration in the anodes can correspond to those cathodes having the lowest $CO_2$ concentration.

Examples of Operating Ranges

In various embodiments of the invention, the process can be approached as starting with a combustion reaction for powering a turbine, an internal combustion engine, or another system where heat and/or pressure generated by a combustion reaction can be converted into another form of power. The fuel for the combustion reaction can comprise or be hydrogen, a hydrocarbon, and/or any other compound containing carbon that can be oxidized (combusted) to release energy. Except for when the fuel contains only hydrogen, the composition of the exhaust gas from the combustion reaction can have a range of $CO_2$ contents, depending on the nature of the reaction (e.g., from at least about 2 vol % to about 25 vol % or less). Thus, in certain embodiments where the fuel is carbonaceous, the $CO_2$ content of the exhaust gas can be at least about 2 vol %, for example at least about 4 vol %, at least about 5 vol %, at least about 6 vol %, at least about 8 vol %, or at least about 10 vol %. Additionally or alternately in such carbonaceous fuel embodiments, the $CO_2$ content can be about 25 vol % or less, for example about 20 vol % or less, about 15 vol % or less, about 10 vol % or less, about 7 vol % or less, or about 5 vol % or less.

Exhaust gases with lower relative $CO_2$ contents (for carbonaceous fuels) can correspond to exhaust gases from combustion reactions on fuels such as natural gas. Higher relative $CO_2$ content exhaust gases (for carbonaceous fuels) can correspond to optimized natural gas combustion reactions, such as those with exhaust gas recycle, or combustion reactions on fuels such as coal.

Other components of the exhaust gas can correspond to any excess oxidant ($O_2$) from the combustion reaction, water vapor, any incomplete combustion products from carbonaceous material (such as CO), and/or other spectator species present in the fuel source or oxidant source.

For example, if air is used as part of the oxidant source, the exhaust gas can include typical components of air such as $N_2$, $H_2O$, and other compounds in minor amounts that are present in air. Depending on the nature of the fuel source, additional species present after combustion based on the fuel source may include $H_2O$, $H_2S$, and other compounds either present in the fuel and/or that are partial or complete combustion products of compounds present in the fuel. The amount of $O_2$ present in the exhaust can advantageously be sufficient to provide the oxygen needed for the cathode reaction in the fuel cell. Thus, the volume percentage of $O_2$ can advantageously be at least 0.5 times the amount of $CO_2$ in the exhaust. Optionally, as necessary, additional air can be added to the exhaust to provide sufficient oxidant for the cathode reaction. When some form of air is used as the oxidant, the amount of $N_2$ in the exhaust can be at least about 50 vol %, e.g., at least about 60 vol %.

The input gas to the cathode can be similar in composition to the exhaust gas from the combustion reaction. Optionally, if the combustion reaction is performed under stoichiometric or nearly stoichiometric conditions, the exhaust gas may contain insufficient oxygen for the cathode reaction. In this situation, additional oxidant (air) may be added to either the exhaust gas or to the cathode input. The temperature and pressure of the exhaust gas from the combustion reaction may be similar or may differ from the input conditions for the fuel cell cathode. A suitable temperature for operation of an MCFC can be between about 500° C. and about 650° C., e.g., with an inlet temperature of about 550° C. and an outlet temperature of about 600° C.

The cathode of a fuel cell can correspond to a plurality of cathodes from an array of fuel cells, as previously described. For the cathode output from the final cathode(s) in an array sequence (typically at least including a series arrangement, or else the final cathode(s) and the initial cathode(s) would be the same), the output composition can include about 2.0 vol % or less of $CO_2$ (e.g., about 1.5 vol % or less or about 1.2 vol % or less). This relatively low concentration can reflect the loss of $CO_2$ as carbonate ions transported across the electrolyte in the fuel cell(s) to the corresponding anode(s). The amount of $O_2$ in the cathode output can also be reduced, typically in an amount proportional to the amount of $CO_2$ removed, which can result in small corresponding increases in the amount(s) of the other (spectator) species at the cathode exit.

At least three input source components can be used for the anode reaction in the fuel cell. One input source is a fuel source, such as a stream containing $H_2$ and/or a fuel that can be reformed into $H_2$ (such as methane or another compound containing carbon and hydrogen). A second input source is a recycle feed from the anode output. A third "input" represents the carbonate ions transported across the electrolyte from the cathode.

The fuel source input can have a ratio of water to fuel appropriate for reforming the hydrocarbon (or hydrocarbon-like) compound in the fuel source used to generate hydrogen. For example, if methane is the input for reforming to generate $H_2$, the ratio of water to fuel can be about two to one. To the degree that $H_2$ is a portion of the fuel, no additional water may typically be needed in the fuel. The fuel source can also optionally contain (small amounts of) components incidental to the fuel source (e.g., a natural gas feed can contain some content of $CO_2$ as an additional component).

Just as with the cathode, the anode of a fuel cell can correspond to a plurality of anodes from an array of fuel cells, as previously described. For the anode output from the final anode(s) in an array sequence (typically at least including a series arrangement, or else the final anode(s) and the initial anode(s) would be the same), the output composition from the final anode(s) can include $H_2O$, $CO_2$, $H_2$, optionally CO, and optionally but typically a smaller portion of unreacted fuel (e.g., $CH_4$). The anode output can include at least about 25 vol % $H_2O$ and from about 20 vol % to about 35 vol % $CO_2$. When the anode is operated to have a reduced fuel utilization, the amount of $H_2$ in the anode output can additionally or alternatively be from about 10 vol % $H_2$ to about 50 vol % $H_2$. At the anode output, when present, the amount of CO can be from about 1 vol % or less to about 10 vol %. Optionally, a reforming stage can be included after the anode output to convert CO and $H_2O$ in the anode output into $CO_2$ and $H_2$, if desired. The anode output can further additionally or alternatively include 2 vol % or less of various other components, such as $N_2$, $CH_4$ (or other unreacted carbon-containing fuels), and/or other components.

After passing through the optional reforming stage, the anode output can be passed through one or more separation stages for removal of water and/or $CO_2$ from the anode output stream. A cryogenic $CO_2$ separator can be an example of a suitable separator. As the anode output is cooled, the majority of the water in the anode output can be separated out as a condensed (liquid) phase. Further cooling and/or pressurizing of the water-depleted anode output flow can then separate out high purity $CO_2$, as the other remaining components in the anode output flow (such as $H_2$, $N_2$, $CH_4$) do not tend to readily form condensed phases. A cryogenic $CO_2$ separator can recover between about 90% and about 99% of the $CO_2$ present in a flow, depending on the operating conditions. Because the anode output can be returned to the to anode input after $CO_2$ removal, the exact $CO_2$ removal efficiency need not be critical. Any $CO_2$ that remains in the anode output flow can simply be returned to the $CO_2$ separation stages in the next loop. This can be in contrast to conventional configurations, where the anode output may be used as a fuel for heating a reformer and/or as an (eventual) input to the cathode of the fuel.

Because both water and $CO_2$ can be readily condensed out from the anode output flow, the stream leaving the separation stage(s) can include from about 30 vol % to about 70 vol % $H_2$, along with 15 vol % or less each of $CO_2$, $H_2O$, $CH_4$, and/or other components that can be considered spectator species during the anode reaction(s).

Applications for $CO_2$ Output after Capture

In various aspects of the invention, the systems and methods described above can allow for production of carbon dioxide as a pressurized liquid. For example, the $CO_2$ generated from a cryogenic separation stage can initially correspond to a pressurized $CO_2$ liquid with a purity of at least about 90%, e.g., at least about 95%, at least about 97%, at least about 98%, or at least about 99%. This pressurized $CO_2$ stream can be used, e.g., for injection into wells in order to further enhance oil or gas recovery such as in secondary oil recovery. When done in proximity to a facility that encompasses a gas turbine, the overall system may benefit from additional synergies in use of electrical/mechanical power and/or through heat integration with the overall system.

Alternatively, for systems dedicated to an enhanced oil recovery (EOR) application (i.e., not comingled in a pipeline system with tight compositional standards), the $CO_2$ separation requirements may be substantially relaxed. The EOR application can be sensitive to the presence of $O_2$, so $O_2$ can be absent, in some embodiments, from a $CO_2$ stream intended for use in EOR. However, the EOR application can tend to have a low sensitivity to dissolved CO, $H_2$, and/or $CH_4$. Those dissolved gases can typically have only subtle impacts on the solubilizing ability of $CO_2$ used for EOR. Injecting gases such as CO, $H_2$, and/or $CH_4$ as EOR gases can result in some loss of fuel value recovery, but such gases can be otherwise compatible with EOR applications.

Additionally or alternately, a potential use for $CO_2$ as a pressurized liquid can be as a nutrient in biological processes such as algae growth/harvesting. The use of MCFCs for $CO_2$ separation can ensure that most biologically significant pollutants could be reduced to acceptably low levels, resulting in a $CO_2$-containing stream having only minor amounts of other "contaminant" gases (such as CO, $H_2$, $N_2$, and the like, and combinations thereof) that are unlikely to substantially negatively affect the growth of photosynthetic organisms. This can be in stark contrast to the output streams generated by most industrial sources, which can often contain potentially highly toxic material such as heavy metals.

In this type of aspect of the invention, the $CO_2$ stream generated by separation of $CO_2$ in the anode loop can be used to produce biofuels and/or chemicals, as well as precursors thereof. Further additionally or alternatively, $CO_2$ may be produced as a liquid, allowing for much easier pumping and transport across distances, e.g., to large fields of photosynthetic organisms. Conventional emission sources can emit hot gas containing modest amounts of $CO_2$ (e.g., about 4-15%) mixed with other gases and pollutants. These materials would normally need to be pumped as a dilute gas to an algae pond or biofuel "farm". By contrast, the MCFC system according to the invention can produce a concentrated $CO_2$ stream (~60-70% by volume on a dry basis) that can be concentrated further to 95%+ (for example 96%+, 97%+, 98%+, or 99%+) and easily liquefied. This stream can then be transported easily and efficiently over long distances at relatively low cost and effectively distributed over a wide area. In these embodiments, residual heat from the combustion source/MCFC may be integrated into the overall system as well.

An alternative embodiment may apply where the $CO_2$ source/MCFC and biological/chemical production sites are co-located. In that case, only minimal compression may be necessary (i.e., to provide enough $CO_2$ pressure to use in the biological production, e.g., from about 15 psig to about 150 psig). Several novel arrangements can be possible in such a case. Secondary reforming may optionally be applied to the anode exhaust to reduce $CH_4$ content, and water-gas shift may optionally additionally or alternately be present to drive any remaining CO into $CO_2$ and $H_2$.

Additional Embodiments

Embodiment 1. A method for capturing carbon dioxide from a combustion source, said method comprising: capturing an output stream from a combustion source, said captured output stream comprising oxygen and carbon dioxide; processing the captured output stream with a fuel cell array of one or more molten carbonate fuel cells (e.g., wherein the fuel cell array comprises a plurality of fuel cells arranged in parallel, a plurality of fuel cells arranged in series, or a combination thereof), the one or more fuel cells each having an anode and a cathode, the molten carbonate fuel cells being operatively connected to the carbon dioxide stream through one or more cathode inlets of molten carbonate fuel cells in the fuel cell array; reacting fuel with to carbonate from the one or more fuel cell cathodes within the one or more fuel cell anodes to produce electricity, an anode exhaust stream from at least one anode outlet of the fuel cell array comprising carbon dioxide and hydrogen, at least a portion of the fuel reacted with carbonate comprising hydrogen recycled from the anode exhaust stream; passing the anode exhaust stream through a water gas shift reaction stage; separating carbon dioxide from the water gas shifted anode exhaust stream in one or more separation stages; and recycling at least a portion of the anode exhaust stream to the anode after separation of the carbon dioxide from the anode exhaust stream.

Embodiment 2. A method for capturing carbon dioxide from a combustion source, said method comprising: capturing an output stream from a combustion source, said captured output stream comprising oxygen and carbon dioxide; processing the captured output stream with a fuel cell array of one or more molten carbonate fuel cells (e.g., wherein the fuel cell array comprises a plurality of fuel cells arranged in parallel, a plurality of fuel cells arranged in series, or a combination thereof), the one or more fuel cells each having an anode and a cathode, the molten carbonate fuel cells being operatively connected to the carbon dioxide stream through one or more cathode inlets of molten carbonate fuel cells in the fuel cell array; reacting fuel with carbonate from the one or more fuel cell cathodes at a fuel utilization of about 60% or less within the one or more fuel cell anodes to produce electricity, an anode exhaust stream from at least one anode outlet of the fuel cell array comprising carbon dioxide and hydrogen, at least a portion of the fuel reacted with carbonate comprising hydrogen recycled from the anode exhaust stream; separating carbon dioxide from the anode exhaust stream in one or more separation stages; and recycling at least a portion of the anode exhaust stream to the anode after separation of the carbon dioxide from the anode exhaust stream.

Embodiment 3. The method of embodiment 1 or embodiment 2, wherein the anode exhaust stream has a hydrogen content of at least about 10 vol %, for example, at least about 20 vol % or at least about 30 vol %.

Embodiment 4. The method of any one of the previous embodiments, wherein the fuel utilization in the one or more fuel cell anodes is about 60% or less, for example, about 55% or less or about 50% or less, the fuel utilization additionally or alternately being at least about 25%, for example at least about 30%, at least about 35%, or at least about 40%.

Embodiment 5. The method of any one of the previous embodiments, wherein the cathode exhaust has a $CO_2$ content of about 2.0 vol % or less, for example about 1.5 vol % or less or about 1.2 vol % or less.

Embodiment 6. The method of any one of the previous embodiments, wherein the fuel comprises a carbon-containing component that is reformed in at least one reforming stage external to the fuel cell array.

Embodiment 7. The method of any one of the previous embodiments, wherein the fuel comprises a carbon-containing component that is reformed in at least one reforming stage internal to an assembly, the assembly comprising the reforming stage and one or more fuel cells in the fuel cell array.

Embodiment 8. The method of any one of the previous embodiments, wherein the hydrogen recycled from the anode exhaust comprises at least about 5 vol % of the fuel, for example, at least about 10 vol %.

Embodiment 9. The method of embodiment 8, wherein the fuel comprises a carbon-containing component, the fuel being passed into the one or more fuel cell anodes without prior reforming.

Embodiment 10. The method of any one of embodiments 6-9, wherein the carbon-containing component comprises methane.

Embodiment 11. The method of any one of the previous embodiments, wherein the fuel cell array comprises at least two stages of fuel cells, for example at least three stages of fuel cells, a fuel cell stage comprising one or more fuel cells in fluid communication in series with at least one fuel cell in a different fuel cell stage (e.g., one or more fuel cell cathodes in fluid communication in series).

Embodiment 12. The method of any one of the previous embodiments, wherein the at least a portion of the anode exhaust stream is recycled as fuel without recycling a portion of the anode exhaust stream, directly or indirectly, to a cathode of the fuel cell array.

Embodiment 13. The method of any one of the previous embodiments, wherein the captured exhaust stream comprises at least about 4 vol % $CO_2$, e.g., at least about 6 vol % $CO_2$.

Embodiment 14. The method of any of the above embodiments, wherein the captured exhaust stream comprises about 8 vol % or less of $CO_2$.

EXAMPLES

A series of simulations were performed in order to demonstrate the benefits of using an improved configuration for using a fuel cell for $CO_2$ separation. The simulations were based on empirical models for the various components in the power generation system. The simulations were based on determining steady state conditions within a system based on mass balance and energy balance considerations.

For the combustion reaction for the turbine, the model included an expected combustion energy value and expected combustion products for each fuel component in the feed to the combustion zone (such as $C_1$-$C_4$ hydrocarbon, $H_2$, and/or CO). This was used to determine the combustion exhaust composition. An initial reforming zone prior to the anode can be operated using an "idealized" reforming reaction to convert $CH_4$ to $H_2$. The anode reaction was modeled to also operate to perform further reforming during anode operation. It is noted that the empirical model for the anode did not require an initial $H_2$ concentration in the anode for the reforming in the anode to take place. Both the anode and cathode reactions were modeled to convert expected inputs to expected outputs at a utilization rate that was selected as a model input. The model for the initial reforming zone and the anode/cathode reactions included an expected amount of heat energy needed to perform the reactions. The model also determined the electrical current generated based on the amount of reactants consumed in the fuel cell and the utilization rates for the reactants based on the Nernst equation. For species that were input to either the combustion zone or the anode/cathode fuel cell that did not directly participate in a reaction within the modeled component, the species were passed through the modeled zone as part of the exhaust or output.

In addition to the chemical reactions, the components of the system had expected heat input/output values and efficiencies. For example, the cryogenic separator had an energy that was required based on the volume of $CO_2$ and $H_2O$ separated out, as well as an energy that was required based on the volume of gas that was compressed and that remained in the anode output flow. Expected energy consumption was also determined for a water gas shift reaction zone, if present, and for compression of recycled exhaust gas. An expected efficiency for electric generation based on steam generated from heat exchange was also used in the model.

The basic configuration used for the simulations included a combustion turbine combine including a compressor, a combustion zone, and an expander. In the base configuration, a natural gas fuel input was provided to the combustion zone. The natural gas input included ~93% $CH_4$, ~2% $C_2H_6$, ~2% $CO_2$, and ~3% $N_2$. The oxidant feed to the compressor had a composition representative of air, including about 70% $N_2$ and about 18% $O_2$. After passing through the expander, a portion of the combustion exhaust gas was passed through a heat recovery steam generation system and then recycled to the compressor. The remainder of the combustion exhaust was passed into the fuel cell cathode. After passing through the fuel cell cathode, the cathode exhaust exited the system. Unless otherwise specified, the portion of the combustion exhaust recycled back to the combustion zone was ~35%. This recycled portion of the combustion exhaust served to increase the $CO_2$ content of the output from the combustion zone. Because the fuel cell area was selected to reduce the $CO_2$ concentration in the cathode output to a fixed value of ~1.45%, recycling the combustion exhaust was found to improve the $CO_2$ capture efficiency.

In various aspects of the invention, the exhaust gas recycle loop of a power generation system can receive a first portion of the exhaust gas from combustion, while the fuel cell array can receive a second portion. Because the fuel cell array can be operated to remove $CO_2$ from the exhaust gas, the $CO_2$ content of the cathode exhaust from the fuel cell array can be relatively low, and therefore would not have been as beneficial for addition to the combustion reaction. The amount of exhaust gas from combustion recycled to the combustion zone of the power generation system can be any convenient amount, such as at least about 15% (by volume), for example at least about 25%, at least about 35%, or at least about 45%. Additionally or alternately, the amount of exhaust gas recirculated to the combustion zone can be about 65% (by volume) or less, for example about 55% or less or about 45% or less.

In the base configuration, the fuel cell was modeled as a single fuel cell of an appropriate size to process the combustion exhaust. This was done to represent use of a corresponding plurality of fuel cells (fuel cell stacks) arranged in parallel having the same active area as the modeled cell. Unless otherwise specified, the fuel utilization in the anode of the fuel cell was set to ~75%. The fuel cell area was allowed to vary, so that the selected fuel utilization results in the fuel cell operating at a constant fuel cell voltage of ~0.7 volts and a constant $CO_2$ cathode output/exhaust concentration of ~1.45 vol %.

In the base configuration, an anode fuel input flow provided the natural gas composition described above as a feed to the anode. Steam was also present to provide a steam to carbon ratio in the input fuel of ~2:1. Optionally, the natural gas input can undergo reforming to convert a portion of the $CH_4$ in the natural gas to $H_2$ prior to entering the anode. When a prior reforming stage is present, ~20% of the $CH_4$ could be reformed to generate $H_2$ prior to entering the anode. The anode output was passed through a cryogenic separator for removal of $H_2O$ and $CO_2$. The remaining portion of the anode output after separation was processed depending on the configuration for each Example.

For a given configuration, a variety of values could be calculated at steady state. For the fuel cell, the amount of $CO_2$ in the anode exhaust and the amount of $O_2$ in the cathode exhaust was determined. The voltage for the fuel cell was fixed at ~0.7 V within each calculation. For conditions that could result in a higher maximum voltage, the voltage was stepped down in exchange for additional current, in order to facilitate comparison between simulations. The area of fuel cell required to achieve a final cathode exhaust $CO_2$ concentration of ~1.45 vol % was also determined to allow for determination of a current density per fuel cell area.

Another set of values were related to $CO_2$ emissions. The percentage of $CO_2$ captured by the system was determined based on the total $CO_2$ generated versus the amount of $CO_2$ (in Mtons/year) captured and removed via the cryogenic separator. The $CO_2$ not captured corresponded to $CO_2$ "lost" as part of the cathode exhaust. Based on the amount of $CO_2$ captured, the area of fuel cell required per ton of $CO_2$ captured could also be determined.

Other values determined in the simulation included the amount of $H_2$ in the anode feed relative to the amount of carbon and the amount of $N_2$ in the anode feed. It is noted that the natural gas used for both the combustion zone and the anode feed included a portion of $N_2$, as would be expected for a typical real natural gas feed. As a result, $N_2$ was present in the anode feed. The amount of heat (or equivalently steam) required for heating the anode feed for reforming was also determined. A similar power penalty was determined based on the power required for compression and separation in the cryogenic separation stages. For configurations where a portion of the anode exhaust was recycled to the combustion turbine, the percentage of the turbine fuel corresponding to $H_2$ was also determined. Based on the operation of the turbine, the fuel cell, and the excess steam generated, as well as any power consumed for heating the reforming zone, compression, and/or separation, a total net power was determined for the system to allow for a net electrical efficiency to be determined based on the amount of natural gas (or to other fuel) used as an input for the turbine and the anode.

FIG. 6 shows results from simulations performed based on several configuration variants. FIG. 6 shows configurations corresponding to a base configuration as well as several configurations where a portion of the anode output was recycled to the anode input. In FIG. 6, a first configuration (1a) was based on passing the remaining anode output after the carbon dioxide and water separation stage(s) into a combustor located after the turbine combustion zone. This provided heat for the reforming reaction and also provided additional carbon dioxide for the cathode input. Configuration 1a was representative of a conventional system, such as the aforementioned Manzolini reference, with the exception that the Manzolini reference did not describe recycle of exhaust gas. Use of the anode output as a feed for the combustor resulted in a predicted fuel cell area of ~208 $km^2$ in order to reduce the $CO_2$ content of the cathode output to ~1.45 vol %. The amount of $CO_2$ lost as part of the cathode exhaust was ~111 lbs $CO_2$/MWhr. Due to the large fuel cell area required for capturing the $CO_2$, the net power generated was ~724 MW per hour. Based on these values, the amount of fuel cell area needed to capture a fixed amount of $CO_2$ could be calculated, such as an area of fuel cell needed to capture a megaton of $CO_2$ during a year of operation. For Configuration 1a, the area of fuel cell required was ~101.4 $km^2$*year/Mton-$CO_2$. The efficiency for generation of electrical power relative to the energy content of all fuel used in the power generation system was ~58.9%. By comparison, the electrical efficiency for the turbine without any form of carbon capture was ~61.1%.

In a second set of configurations (2a-2e), the anode output was recycled to the anode input. Configuration 2a represented a basic recycle of the anode output after separation to the anode input. Configuration 2b included a water gas shift reaction zone prior to the carbon dioxide separation stages. Configuration 2c did not include a reforming stage prior to the anode input. Configuration 2d included a reforming stage, but was operated with a fuel utilization of ~50% instead of ~75%. Configuration 2e was operated with a fuel utilization of ~50% and did not have a reforming stage prior to the anode.

Recycling the anode output back to the anode input, as shown in Configuration 2a, resulted in a reduction of the required fuel cell area to ~161 $km^2$. However, the $CO_2$ loss from the cathode exhaust was increased to ~123 lbs $CO_2$/MWhr. This was due to the fact that additional $CO_2$ was not being added to the cathode input by the combustion of anode exhaust in a combustor after the turbine. Instead, the $CO_2$ content of the cathode input was based only on the $CO_2$ output of the combustion zone. The net result in Configuration 2a was a lower area of fuel cell per ton of $CO_2$ captured of ~87.5 $km^2$*year/Mton-$CO_2$, but a modestly higher amount of $CO_2$ emissions. Due to the reduced fuel cell area, the total power generated was ~661 MW. Although the net power generated in Configuration 2a was about 10% less than the net power in Configuration 1a, the fuel cell area was reduced by more than 20%. The electrical efficiency was ~58.9%.

In Configuration 2b, the additional water gas shift reaction zone increased the hydrogen content delivered to the anode, which reduced the amount of fuel needed for the anode reaction. Including the water gas shift reaction zone in Configuration 2b resulted in a reduction of the required fuel cell area to ~152 $km^2$. The $CO_2$ loss from the cathode exhaust was ~123 lbs $CO_2$/MWhr. The area of fuel cell per megaton of $CO_2$ captured was ~82.4 $km^2$*year/Mton-$CO_2$. The total power generated was ~664 MW. The electrical efficiency was ~59.1%.

Configuration 2c can take further advantage of the hydrogen content in the anode recycle by eliminating the reforming of fuel occurring prior to entering the anode. In Configuration 2c, reforming can still occur within the anode itself. However, in contrast to a conventional system incorporating a separate reforming stage prior to entry into the fuel cell anode, Configuration 2c relied on the hydrogen content of the recycled anode gas to provide the minimum hydrogen content for sustaining the anode reaction. Because a separate reforming stage was not required, the heat energy was not consumed to maintain the temperature of the reforming stage. Configuration 2c resulted in a reduction of the required fuel cell area to ~149 $km^2$. The $CO_2$ loss from the cathode exhaust was ~122 lbs $CO_2$/MWhr. The area of fuel cell per ton of $CO_2$ captured was ~80.8 $km^2$*year/Mton-$CO_2$. The total power generated was ~676 MW. The electrical efficiency was ~60.2%. Based on the simulation results, eliminating the reforming step seemed to have only a modest impact on the required fuel cell area, but the electrical efficiency appeared to be improved by about 1% relative to Configuration 2b. For an industrial scale power generation plant, an efficiency improvement of even only 1% is believed to represent an enormous advantage over the course of a year in power generation.

In Configuration 2d, reforming was still performed to convert ~20% of the methane input to the anode into $H_2$ prior to entering the anode. Instead, the fuel utilization within the anode was reduced from ~75% to ~50%. This resulted in a substantial reduction of the required fuel cell area to ~113 $km^2$. The $CO_2$ loss from the cathode exhaust was ~123 lbs $CO_2$/MWhr. The area of fuel cell per ton of $CO_2$ captured was ~61.3 $km^2$*year/Mton-$CO_2$. The total power generated was ~660 MW. The electrical efficiency was ~58.8%. Based on the simulation results, reducing the fuel utilization provided a substantial reduction in fuel cell area. Additionally, in comparison with Configurations 2b and 2e, Configuration 2d unexpectedly provided the lowest fuel cell area for achieving the desired level of $CO_2$ removal.

Configuration 2e incorporated both the reduced fuel utilization of ~50% as well as elimination of the reforming stage prior to the anode inlet. This configuration provided a combination of improved electrical efficiency and reduced fuel cell area. However, the fuel cell area was slightly larger than the fuel cell area required in Configuration 2d. This was surprising, as eliminating the reforming stage prior to the anode inlet in Configuration 2c reduced the fuel cell area in comparison with Configuration 2b. Based on this, it would have been expected that Configuration 2e would provide a further reduction in fuel cell area relative to Configuration 2d. In Configuration 2e, the $CO_2$ loss from the cathode exhaust was ~124 lbs $CO_2$/MWhr. The area of fuel cell per ton of $CO_2$ captured of ~65.0 $km^2$*year/Mton-$CO_2$. The total power generated was ~672 MW. The electrical efficiency was ~59.8%. It is noted that Configuration 2d generated only 2% less power than Configuration 2e, while the fuel cell area of Configuration 2d was at least 6% lower than Configuration 2e.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A method for capturing carbon dioxide from a combustion source, said method comprising:
    capturing an output stream from a combustion source, said captured output stream comprising oxygen and carbon dioxide;
    processing the captured output stream with a fuel cell array of one or more molten carbonate fuel cells, the one or more fuel cells each having an anode and a cathode, the molten carbonate fuel cells being operatively connected to the carbon dioxide stream through one or more cathode inlets of molten carbonate fuel cells in the fuel cell array;
    reacting fuel with carbonate from the one or more fuel cell cathodes within the one or more fuel cell anodes to produce electricity and to produce an anode exhaust stream from at least one anode outlet of the fuel cell array comprising carbon dioxide and hydrogen, at least a portion of the fuel reacted with carbonate comprising hydrogen recycled from the anode exhaust stream;
    passing at least a portion of the anode exhaust stream through a water gas shift reaction stage;
    separating carbon dioxide from the water gas shifted anode exhaust stream in one or more separation stages; and
    recycling at least a portion of the water gas shifted anode exhaust stream to the anode after separation of the carbon dioxide from the water gas shifted anode exhaust stream,
    wherein a cathode exhaust has a $CO_2$ content at a cathode exit of about 2.0 vol % or less.

2. The method of claim 1, wherein the hydrogen content of the anode exhaust stream at the at least one anode outlet is at least about 10 vol %.

3. The method of claim 1, wherein the fuel utilization in the one or more fuel cell anodes is about 60% or less.

4. The method of claim 1, wherein the fuel comprises a carbon-containing component that is reformed in at least one reforming stage external to the fuel cell array.

5. The method of claim 1, wherein the fuel comprises a carbon-containing component that is reformed in at least one reforming stage internal to an assembly, the assembly comprising the reforming stage and one or more fuel cells in the fuel cell array.

6. The method of claim 1, wherein the hydrogen recycled from the anode exhaust stream comprises at least about 5 vol % of the fuel.

7. The method of claim 6, wherein the fuel comprises a carbon-containing component, the fuel being passed into the one or more fuel cell anodes without prior reforming.

8. The method of claim 7, wherein the carbon-containing component comprises methane.

9. The method of claim 1, wherein the fuel cell array comprises a plurality of fuel cells arranged in parallel, a plurality of fuel cells arranged in series, or a combination thereof.

10. The method of claim 1, wherein the fuel cell array comprises at least two stages of fuel cells, such as at least three stages of fuel cells, a fuel cell stage comprising one or more fuel cells in fluid communication in series with at least one fuel cell in a different fuel cell stage.

11. The method of claim 10, where the one or more fuel cells in fluid communication in series comprise one or more fuel cell cathodes in fluid communication in series.

12. The method of claim 1, wherein the at least a portion of the water gas shifted anode exhaust stream is recycled as fuel without recycling a portion of the anode exhaust stream, directly or indirectly, to a cathode of the fuel cell array.

13. The method of claim 1, wherein the captured exhaust stream comprises at least about 4 vol % $CO_2$.

14. The method of claim 1, wherein the captured exhaust stream comprises about 8 vol % or less of $CO_2$.

15. A method for capturing carbon dioxide from a combustion source, said method comprising:
    capturing an output stream from a combustion source, said captured output stream comprising oxygen and carbon dioxide;
    processing the captured output stream with a fuel cell array of one or more molten carbonate fuel cells, the one or more fuel cells each having an anode and a cathode, the molten carbonate fuel cells being operatively connected to the carbon dioxide stream through one or more cathode inlets of molten carbonate fuel cells in the fuel cell array;
    reacting fuel with carbonate from the one or more fuel cell cathodes at a fuel utilization of about 60% or less within the one or more fuel cell anodes to produce electricity and to produce an anode exhaust stream from at least one anode outlet of the fuel cell array comprising carbon dioxide and hydrogen, at least a portion of the fuel reacted with carbonate comprising hydrogen recycled from the anode exhaust stream;
    separating carbon dioxide from the anode exhaust stream in one or more separation stages; and
    recycling at least a portion of the anode exhaust stream to the anode after separation of the carbon dioxide from the anode exhaust stream,
    wherein a cathode exhaust has a $CO_2$ content at a cathode exit of about 2.0 vol % or less.

16. The method of claim 15, wherein the hydrogen content of the anode exhaust stream at the at least one anode outlet is at least about 20 vol %.

17. The method of claim 15, wherein the fuel utilization in the one or more fuel cell anodes is at least about 40%.

18. The method of claim 15, wherein the $CO_2$ content of the cathode exhaust at the cathode exit is about 1.5 vol % or less.

19. The method of claim 15, wherein the fuel comprises a carbon-containing component that is reformed in at least one reforming stage that is external to the fuel cell array.

20. The method of claim 15, wherein the fuel comprises a carbon-containing component that is reformed in at least one reforming stage that is internal to an assembly, the assembly comprising the reforming stage and one or more fuel cells in the fuel cell array.

21. The method of claim 15, wherein the hydrogen recycled from the anode exhaust comprises at least about 5 vol % of the fuel.

22. The method of claim 21, wherein the fuel comprises a carbon-containing component, the fuel being passed into the one or more fuel cell anodes without prior reforming.

23. The method of claim 22, wherein the carbon-containing component comprises methane.

24. The method of claim 15, wherein the fuel cell array comprises a plurality of fuel cells arranged in parallel, a plurality of fuel cells arranged in series, or a combination thereof.

25. The method of claim 15, wherein the fuel cell array comprises at least two stages of fuel cells, such as at least three stages of fuel cells, a fuel cell stage comprising one or more fuel cells in fluid communication in series with at least one fuel cell in a different fuel cell stage.

26. The method of claim 25, where the one or more fuel cells in fluid communication in series comprise one or more fuel cell cathodes in fluid communication in series.

27. The method of claim 15, wherein the at least a portion of the anode exhaust stream is recycled as fuel without recycling a portion of the anode exhaust stream, directly or indirectly, to a cathode of the fuel cell array.

28. The method of claim 15, wherein the captured exhaust stream comprises at least about 4 vol % $CO_2$.

29. The method of claim 15, wherein the captured exhaust stream comprises about 8 vol % or less of $CO_2$.

30. The method of claim 15, wherein at least a second portion of the anode exhaust stream is passed through a water gas shift reaction stage prior to the separating of carbon dioxide from the anode exhaust stream.

* * * * *